(12) United States Patent
Schuman et al.

(10) Patent No.: US 11,592,546 B1
(45) Date of Patent: Feb. 28, 2023

(54) ANGLE-DOPPLER KEYSTONE FORMATTING FOR AIRBORNE LOOK-DOWN RADAR SYSTEM

(71) Applicant: SRC, INC., North Syracuse, NY (US)

(72) Inventors: Harvey K. Schuman, Fayetteville, NY (US); Daniel D. Thomas, Jr., Liverpool, NY (US); Jason M. Steeger, Baldwinsville, NY (US); Lun Z. Chen, Brooklyn, NY (US)

(73) Assignee: SRC, Inc., North Syracuse, NY (US)

( * ) Notice: Subject to any disclaimer, the term of this patent is extended or adjusted under 35 U.S.C. 154(b) by 623 days.

(21) Appl. No.: 16/371,826

(22) Filed: Apr. 1, 2019

Related U.S. Application Data

(60) Provisional application No. 62/750,465, filed on Oct. 25, 2018.

(51) Int. Cl.
| | |
|---|---|
| *G01S 13/524* | (2006.01) |
| *G01S 13/58* | (2006.01) |
| *G01S 13/90* | (2006.01) |
| *G01S 7/41* | (2006.01) |
| *G01S 7/28* | (2006.01) |

(Continued)

(52) U.S. Cl.
CPC ........ *G01S 13/5244* (2013.01); *G01S 7/2813* (2013.01); *G01S 7/414* (2013.01); *G01S 13/42* (2013.01); *G01S 13/5242* (2013.01); *G01S 13/582* (2013.01); *G01S 13/9029* (2013.01); *G01S 2013/0245* (2013.01)

(58) Field of Classification Search
CPC .... G01S 13/5244; G01S 7/2813; G01S 7/414; G01S 13/42; G01S 13/5242; G01S 13/582; G01S 13/9029; G01S 2013/0245

USPC .......................................... 342/62, 159, 161
See application file for complete search history.

(56) References Cited

U.S. PATENT DOCUMENTS 4,093,949 A * 6/1978 Evans ................. G01S 13/5244
342/194
4,180,792 A * 12/1979 Lederman ............. B06B 1/0622
342/380

(Continued)

FOREIGN PATENT DOCUMENTS

| CN | 105445718 A | * | 3/2016 | |
|---|---|---|---|---|
| CN | 106054157 A | * | 10/2016 | ............... G01S 7/41 |

(Continued)

OTHER PUBLICATIONS

Jun Li, Bistatic MIMO Radar Space-time Adaptive Processing, IEEE (Year: 2009).*

(Continued)

*Primary Examiner* — Erin F Heard
*Assistant Examiner* — Michael W Justice
(74) *Attorney, Agent, or Firm* — George McGuire

(57) ABSTRACT

An airborne radar system and signal interpretation approach that detects slow moving ground targets using angle and Doppler of Keystone formatting process, and is referred to as Angle-Doppler Keystone Formatting (ADK). ADK collapses the clutter ridge to a constant Doppler or to a constant angle, thereby transforming a clutter ridge in angle-Doppler space into a horizontal line of constant Doppler or a vertical line of constant angle. Clutter may then be filtered more effectively, such as by using multiple beams as the source of STAP training data or by using multiple Doppler bins.

10 Claims, 44 Drawing Sheets

(51) Int. Cl.
G01S 13/42 (2006.01)
G01S 13/02 (2006.01)

(56) References Cited

U.S. PATENT DOCUMENTS

| | | | | |
|---|---|---|---|---|
| 5,235,338 | A * | 8/1993 | Hsiao | G01S 13/5248 342/162 |
| 6,426,718 | B1 * | 7/2002 | Ridgway | G01S 13/9029 342/159 |
| 6,633,253 | B2 * | 10/2003 | Cataldo | G01S 13/5244 342/25 R |
| 6,756,935 | B1 * | 6/2004 | Cameron | G01S 13/5244 342/160 |
| 7,038,618 | B2 * | 5/2006 | Budic | G01S 13/003 342/159 |
| 7,212,149 | B2 * | 5/2007 | Abatzoglou | G01S 13/9029 342/25 R |
| H2222 | H * | 8/2008 | Rangaswamy | G01S 13/5246 342/159 |
| 7,450,057 | B2 * | 11/2008 | Clark | G01S 13/5246 342/160 |
| 7,675,458 | B2 * | 3/2010 | Hubbard | G01S 13/5246 342/159 |
| 8,994,584 | B2 * | 3/2015 | Ranney | G01S 13/9019 342/161 |
| 9,772,402 | B2 * | 9/2017 | Schuman | G01S 13/5244 |
| 10,054,680 | B2 * | 8/2018 | Owirka | G01S 13/5242 |
| 10,649,075 | B2 * | 5/2020 | Schuman | G01S 7/414 |
| 2005/0237236 | A1 * | 10/2005 | Budic | G01S 13/5244 342/159 |
| 2005/0280571 | A1 * | 12/2005 | Abatzoglou | G01S 13/9029 342/107 |
| 2008/0174475 | A1 * | 7/2008 | Clark | G01S 13/5246 342/162 |
| 2014/0009324 | A1 * | 1/2014 | Ranney | G01S 7/414 |
| 2014/0145887 | A1 * | 5/2014 | Irvine | G01S 13/5244 |
| 2016/0091598 | A1 * | 3/2016 | Vouras | G01S 7/414 |
| 2016/0170019 | A1 * | 6/2016 | Owirka | G01S 13/9029 342/25 B |
| 2017/0102458 | A1 * | 4/2017 | Schuman | G01S 7/414 |
| 2018/0031690 | A1 * | 2/2018 | Schuman | G01S 7/288 |

FOREIGN PATENT DOCUMENTS

| | | | | |
|---|---|---|---|---|
| CN | 106249229 | A * | 12/2016 | ......... G01S 13/0209 |
| CN | 106501785 | A * | 3/2017 | |
| CN | 106501785 | B * | 4/2018 | |
| CN | 110632573 | A * | 12/2019 | |

OTHER PUBLICATIONS

Hu Yili, Short-range clutter suppression method combining oblique projection and interpolation in airborne CFA radar, Journal of Systems Engineering and Electronics vol. 32, No. 1 (Year: 2021).*
Yuzhuo Wang, Range-Ambiguous Clutter Suppression via FDA MIMO Planar Array Radar with Compressed Sensing, Remote Sensing. 2022, 14, 1926. (Year: 2022).*
Dr. P.K. Sanyal, et al, Detecting Moving Targets in SAR via Keystoning and Phase Interferometry, pp. 1-6, 2005 The MITRE Corporation, Rome, NY.
P.K. Sanyal, et al, Detecting Moving Targets in SAR via Keystoning and Multiple Phase Center Interferometry, pp. 1-6, The MITRE Corp., Rome, NY.
P.K. Sanyal, et al, Tracking Moving Ground Targets from Airborne, SAR via Keystoning and Multiple Phase Center Interferometry, pp. 1-6, The MITRE Corp., Rome, NY.
P.K. Sanyal, et al, Detecting and Geo-locating Moving Ground Targets in Airborne QuickSAR via Keystoning and Multiple Phase Center Interferometry, pp. 1-11, The MITRE Corp., Rome, NY.
Dr. D.M. Zasada, et al, Detecting Moving Targets in Multiple-Channel SAR via Double Thresholding, pp. 1-7, The MITRE Corp., Rome, NY.
D.P. McGarry, et al, Using a Clustering Technique for Detection of Moving Targets in Clutter-Cancelled QuickSAR Images, pp. 1-5, The MITRE Corporation, Rome, NY.
P.K. Sanyal, et al, Computational Burden in Moving Target Detection in Multi-Channel SAR using Phase Interferometry, pp. 1-4, The MITRE Corp., Rome, NY.
R.P. Perry, et al, SAR Imaging of Moving Targets, pp. 0-13, IEEE Transactions on Aerospace and Electronic Systems vol. 25, No. 1, Jan. 1999, The MITRE Corporation, Bedford, MA.

* cited by examiner

ANGLE-DOPPLER KEYSTONE FORMATTING FOR AIRBORNE LOOK-DOWN RADAR SYSTEM

CROSS-REFERENCE TO RELATED APPLICATIONS

This application claims the benefit of Provisional Application Ser. No. 62/750,465, filed on Oct. 25, 2018, which is relied upon and incorporated herein by reference in its entirety.

BACKGROUND OF THE INVENTION

1. Field of the Invention

The present invention to airborne look-down radar systems and, more specifically, to the detection of moving ground targets.

2. Description of the Related Art

Airborne look-down radar systems must contend with ground clutter that is spread in Doppler due to the motion of the platform. The clutter spread is correlated with angle. Several multichannel processing methods have been developed that apply this correlation in suppressing clutter and enabling detection of moving ground targets. These methods include Displaced Phase Center Antenna (DPCA) and space-time adaptive processing (STAP). Wideband signals and large aperture antennas introduce dispersion that requires additional processing. Dispersion can be mitigated in part by Angle Keystone Formatting (or more precisely Range-Angle Keystone Formatting). Range-Angle Keystone Formatting suppresses array dispersion in a manner similar to the more familiar Range Keystone Formatting (or more precisely Range-Doppler Keystone Formatting) that suppresses range walk.

BRIEF SUMMARY OF THE INVENTION

The present invention comprises the detection of slow moving ground targets using an approach that employs the third possible paring of domains in a Keystone Formatting process: angle and Doppler, and is referred to herein as Angle-Doppler Keystone Formatting (ADK). ADK is capable of collapsing the clutter ridge to a constant Doppler or to a constant angle. In other words, the "clutter ridge" in angle-Doppler space transforms to a "horizontal line" of constant Doppler or a "vertical line" of constant angle. Clutter is then filtered more effectively, such as by using multiple beams as the source of STAP training data with the constant Doppler option or by using multiple Doppler bins with the constant angle option. Keystone formatting has been proven an efficient means of transforming such data. Alternatively, Higher Order Doppler Warping (HODW) developed to facilitate the use of STAP in bistatic radar by aligning the clutter ridge between range cells could be applied, as well, but HODW may not be as efficient or as accurate as Keystone Formatting. With HODW both PRI data ("pulse data") and channel (antenna element or subarray) data must be transformed into Doppler bins and beams respectively. With ADK only one of those domains need be transformed.

The present invention offers a unique capability of detecting targets with airborne (or space borne) multichannel radars. The radar platforms can be manned or unmanned. ADK applies particularly to side looking radar. An array antenna is side mounted on the moving platform. The array horizontal axis generally is aligned with the velocity vector. However, the axis and velocity vectors can be misaligned (as in platform "crabbing"). ADK according to the present invention is viable for Space-Time Adaptive Processing (STAP) detection of slow movers with "single-range-cell processing" even with platform undergoing crab (single-range-cell processing refers to STAP whereby the adaptive filter to be applied to a range cell under test for a target is generated using only data from that "test" range cell).

More specifically, the present invention includes an airborne radar system, comprising an antenna having multiple channels for receiving a plurality of radar signals having a pulse repetition interval and containing a clutter signal through each of the multiple channels and a processor coupled to the multichannel antenna that is configured to sample each received radar signal in each of the multiple channels, to transform each received radar signal for each pulse repetition interval into the frequency domain, to transform any pulse repetition interval components of each frequency of the clutter signal into a Doppler frequency bin, and to zero the Doppler frequency bin for each frequency of the clutter signal. The processor may be also configured to identify a clutter signal corresponding to scattering from a patch of ground using the formula $$c'(p, m, n) = B_p(m, n)\exp\left(j\frac{2\pi f_p}{\lambda_0 f_0}u(v_m)nd\right)$$

where d denotes the channel spacing, $f_p$ denotes a pth spectral frequency, and $f_0$ and $\lambda_0$ correspond to a carrier frequency and wavelength, respectively, and $u(v_m)=u_m$ is the inverse of the formula relating $u_m$, the sine of the complement of the cone angle ($\theta$) to the Doppler velocity ($v_m$). The formula is a known function of geometry and platform motion. An example of such formula is:

$$v_m = v_0(u_m \cos\theta_c + (1-u_m^2)^{0.5} \sin\theta_c)$$

where $\theta_c$ denotes a crab angle referenced clockwise with respect to an axis of the antenna. The processor is further configured to resample the array to provide a plurality of virtual element locations and to obtain distinct interelement spacing for each Doppler frequency bin. The distinct interelement spacing is selected according to the formula $$u_m d_m = u_{ref} d$$

where $u_{ref}$ denotes the sine angle at which a vertical constant sine-angle ridge will appear in angle-Doppler space. The processor is additionally programmed to center the interpolated signals within an aperture of the antenna by computing an offset. The processor is also programmed to perform space-time adaptive processing on the interpolated signals.

The present invention also includes a method of performing airborne radar, comprising the steps of providing an antenna having multiple channels for receiving a plurality of radar signals having a pulse repetition interval and a clutter signal through each of the multiple channels, receiving the plurality of radar signals through each of the multiple channels, sampling the plurality of received radar signals, transforming each of the received signals for each pulse repetition interval into the frequency domain, transforming any pulse repetition interval components of each frequency of the clutter signal into a Doppler frequency bin, and zeroing the Doppler frequency bin for each frequency of the clutter signal.

The method may additionally comprise the step of identifying a clutter signal corresponding to scattering from a patch of ground using the formula $$c'(p, m, n) = B_p(m, n)\exp\left(j\frac{2\pi f_p}{\lambda_0 f_0}u(v_m)nd\right)$$

where d denotes the channel spacing, $f_p$ denotes a pth spectral frequency, and $f_0$ and $\lambda_0$ correspond to a carrier frequency, and $u(v_m)=u_m$ is the inverse of the appropriate angle-Doppler formula given, for example, by $$v_m = v_0(u_m \cos\theta_c + (1-u_m^2)^{0.5}\sin\theta_c)$$

where $\theta_c$ denotes a crab angle referenced clockwise with respect to an axis of the antenna. The method may further comprise the step of resampling the array to provide a plurality of virtual element locations to obtain distinct interelement spacing for each Doppler frequency bin. The distinct interelement spacing may be selected according to the formula $$u_m d_m = u_{ref} d$$

where $u_{ref}$ denotes the sine angle at which a vertical constant sine-angle ridge will appear in angle-Doppler space. The method may additionally comprise the step of centering the interpolated signals within an aperture of the antenna by computing an offset. The method may further comprise the step of performing space-time adaptive processing on the interpolated signals.

BRIEF DESCRIPTION OF THE SEVERAL VIEWS OF THE DRAWING(S)

The present invention will be more fully understood and appreciated by reading the following Detailed Description in conjunction with the accompanying drawings, in which.

Figure 10:
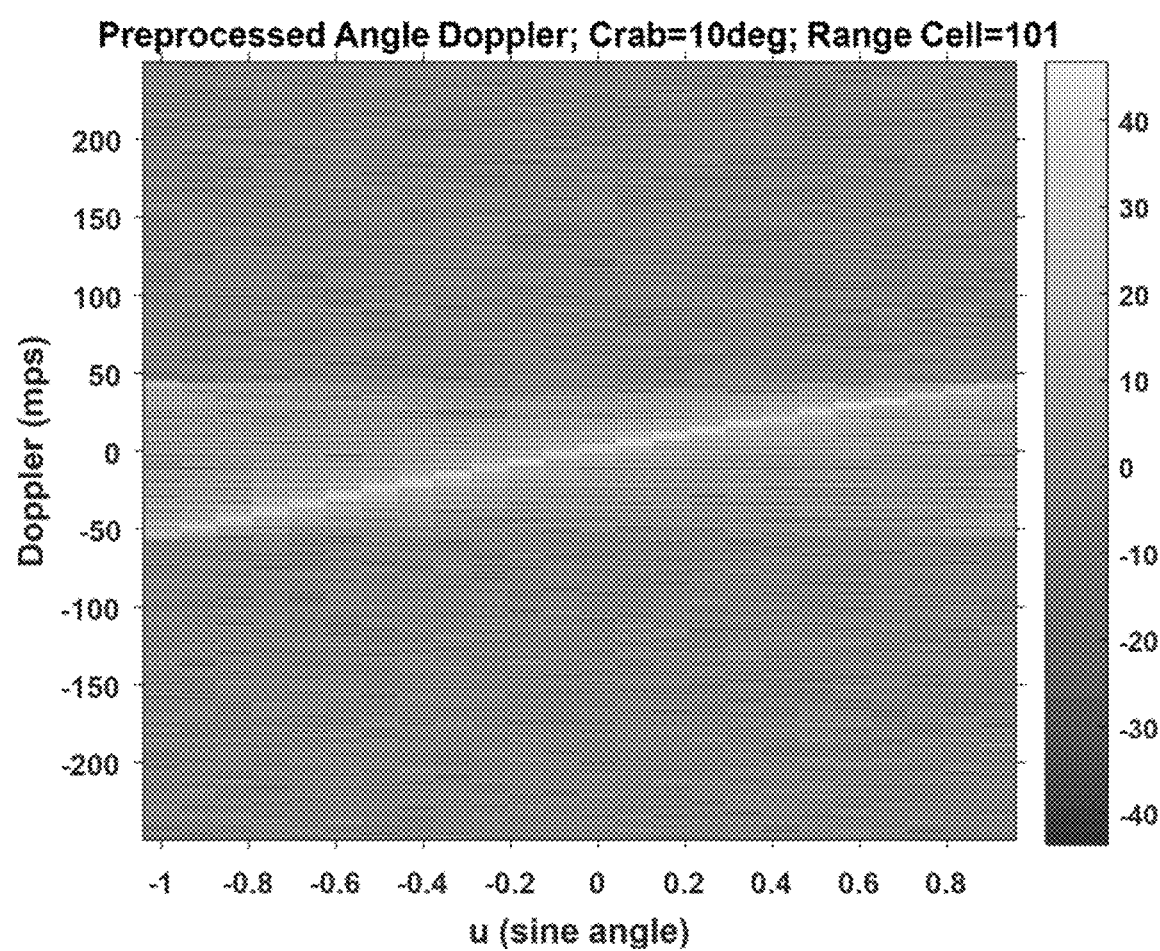
Figure 11:
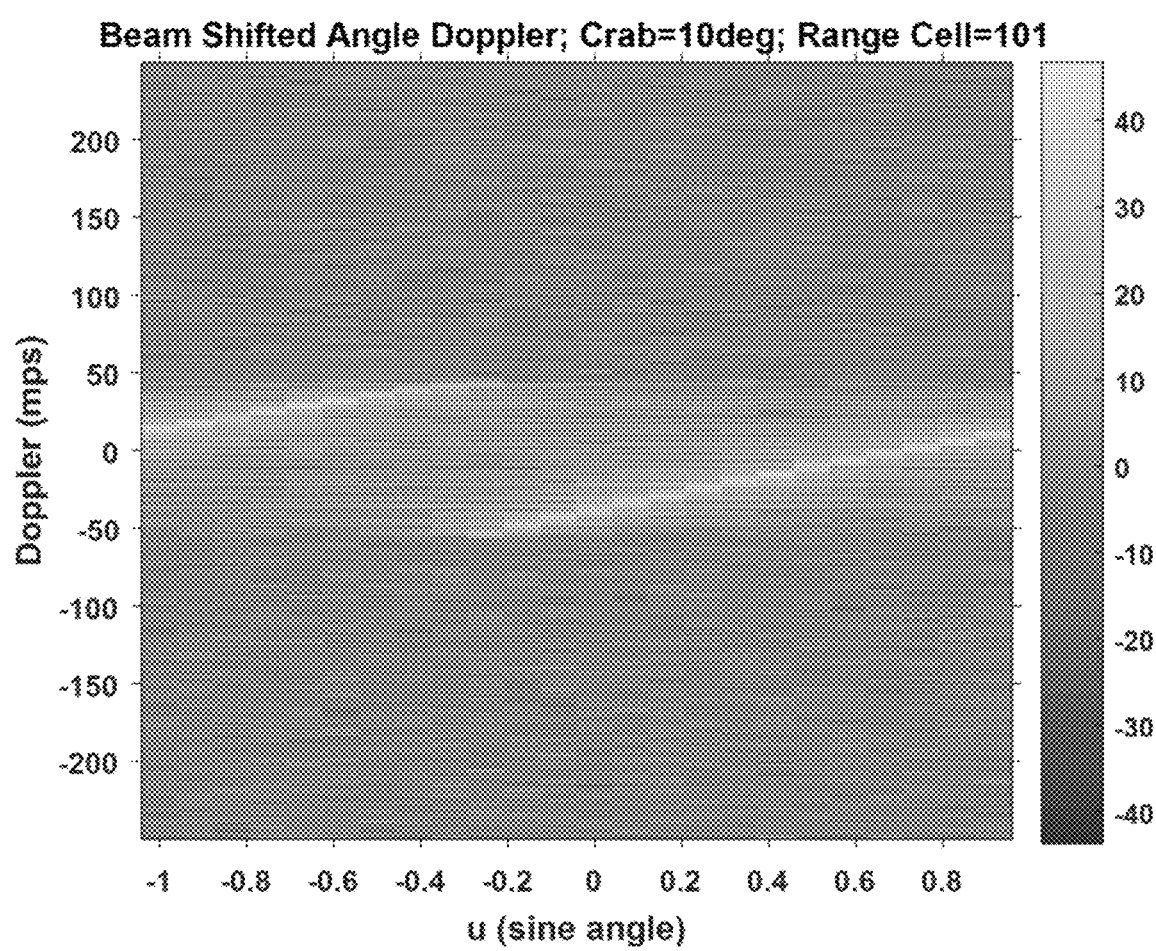
Figure 12:
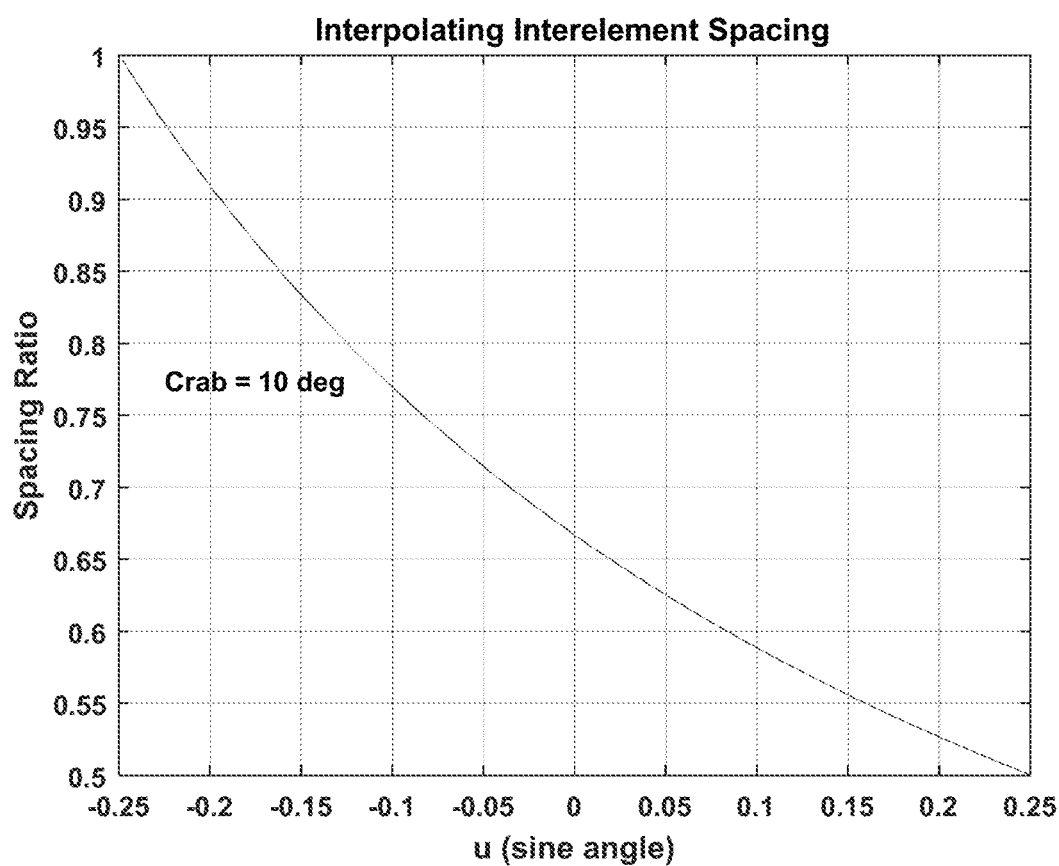
Figure 13:
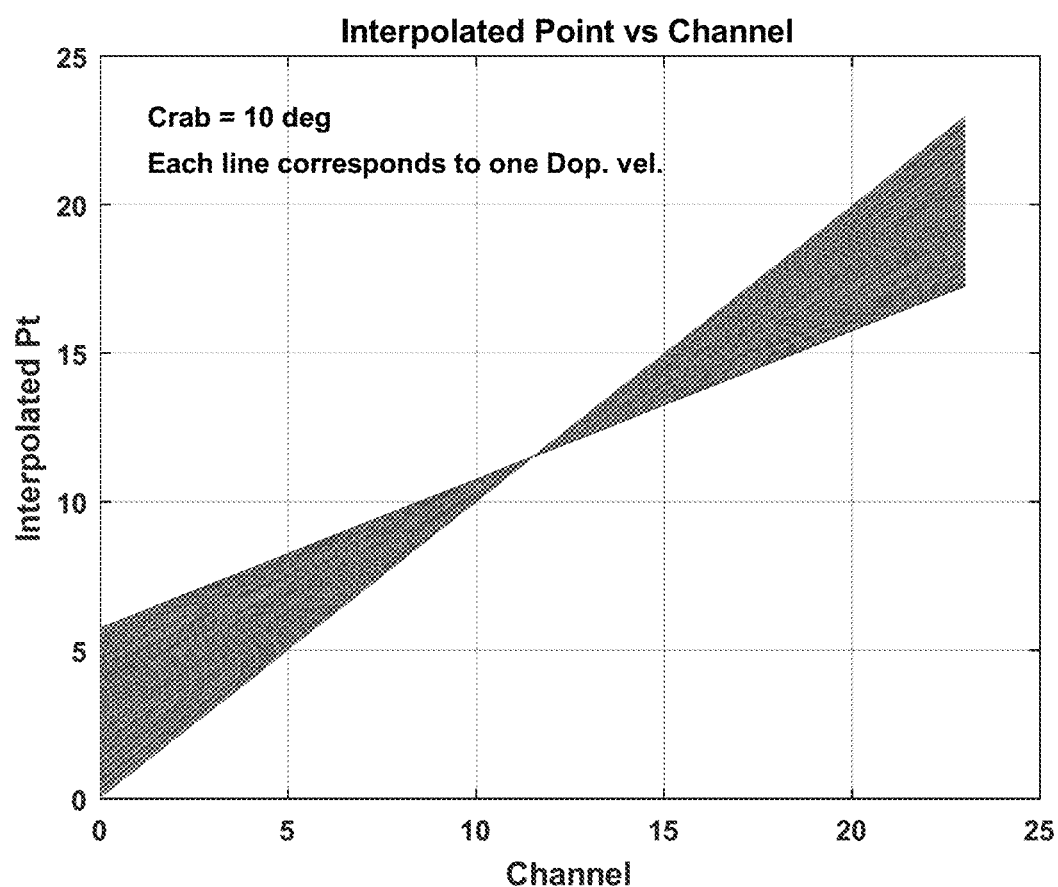
Figure 14:
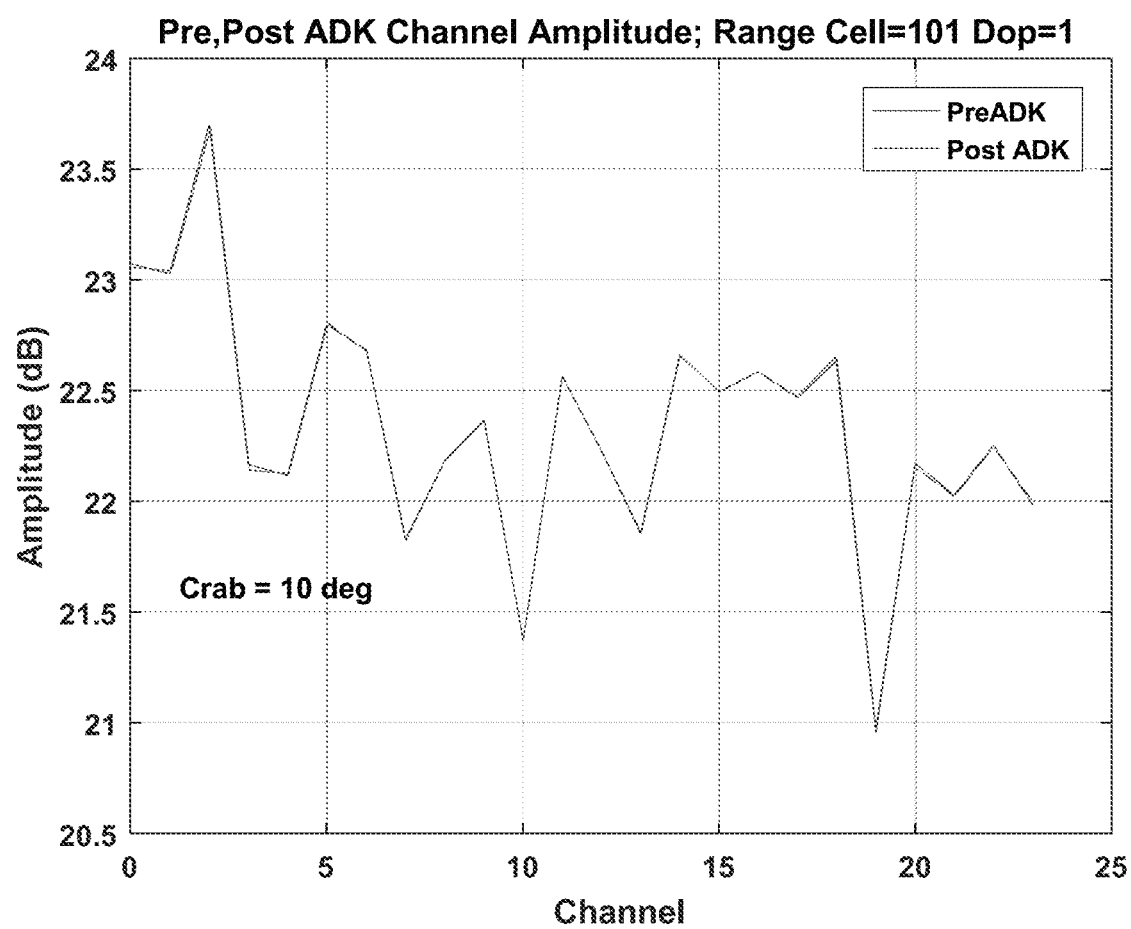
Figure 15:
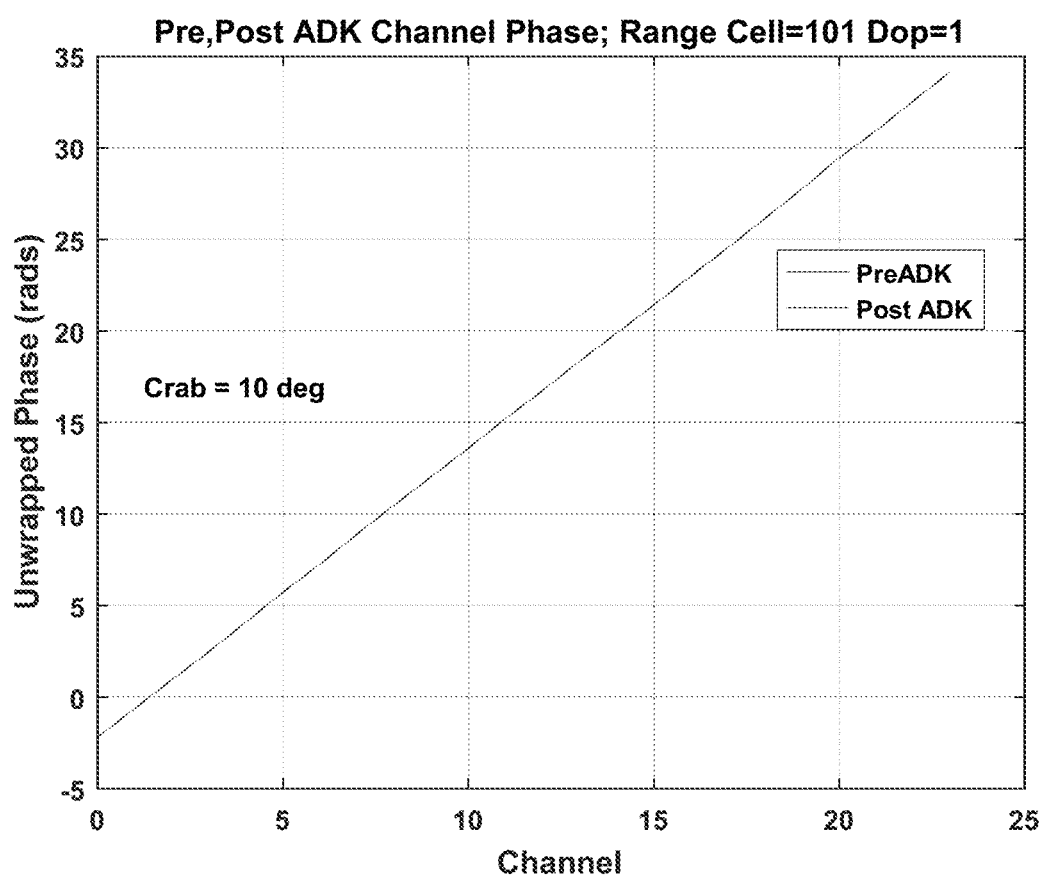
Figure 16:
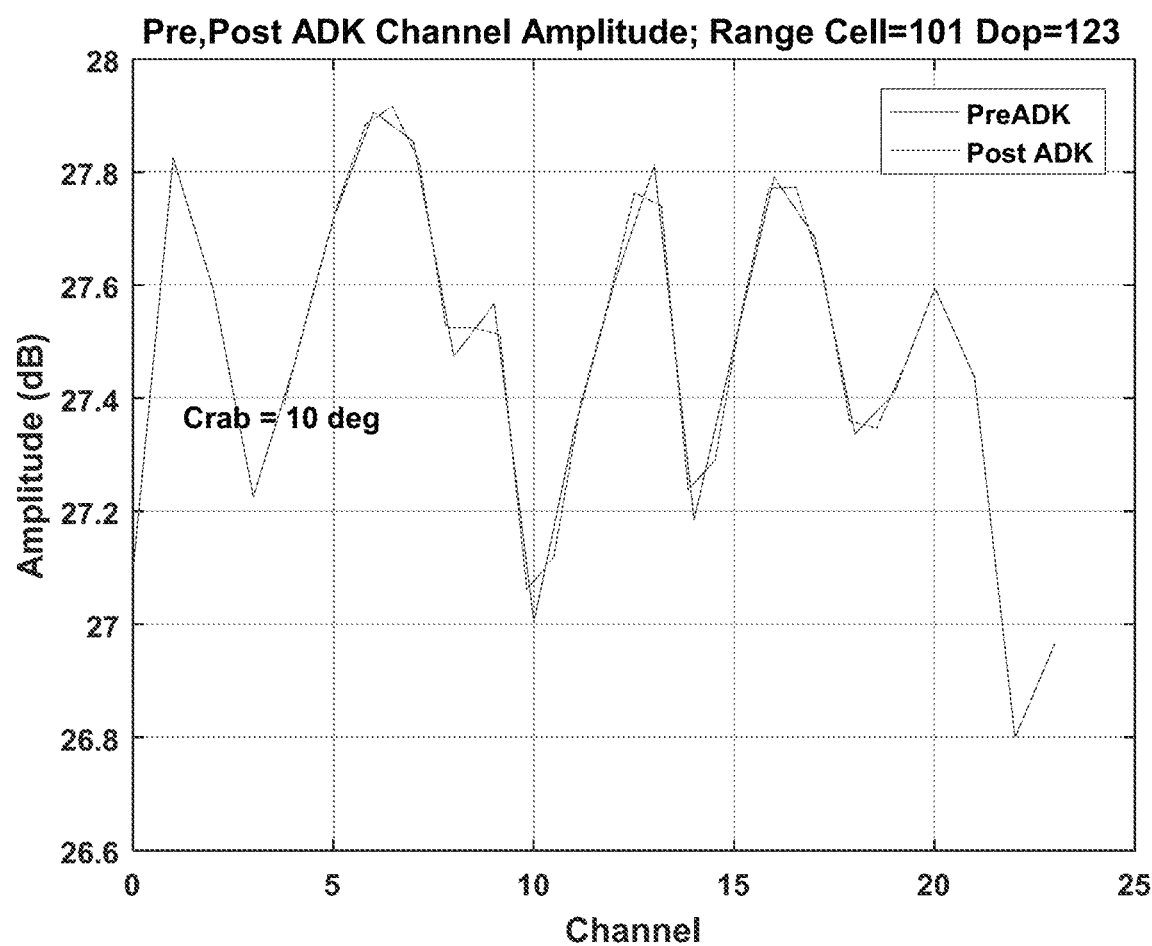
Figure 17:
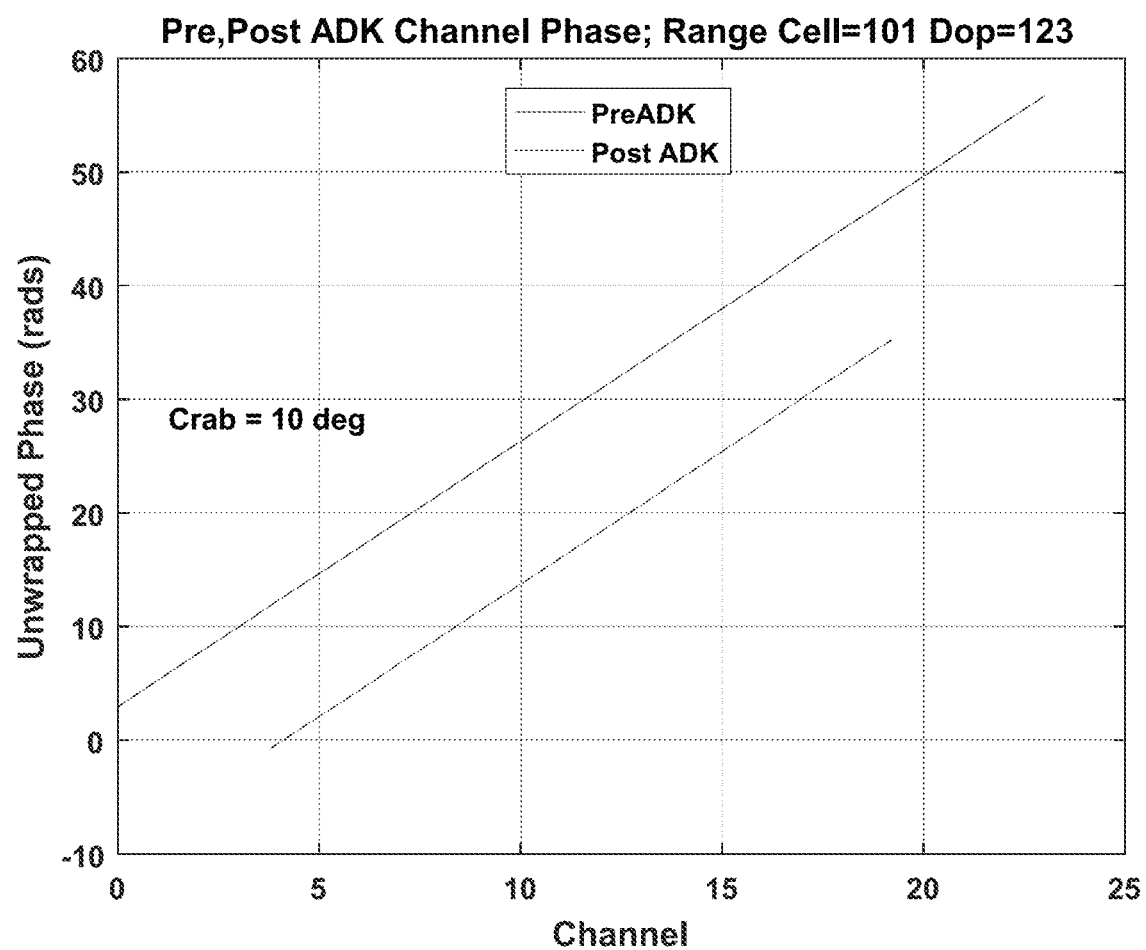
Figure 18:
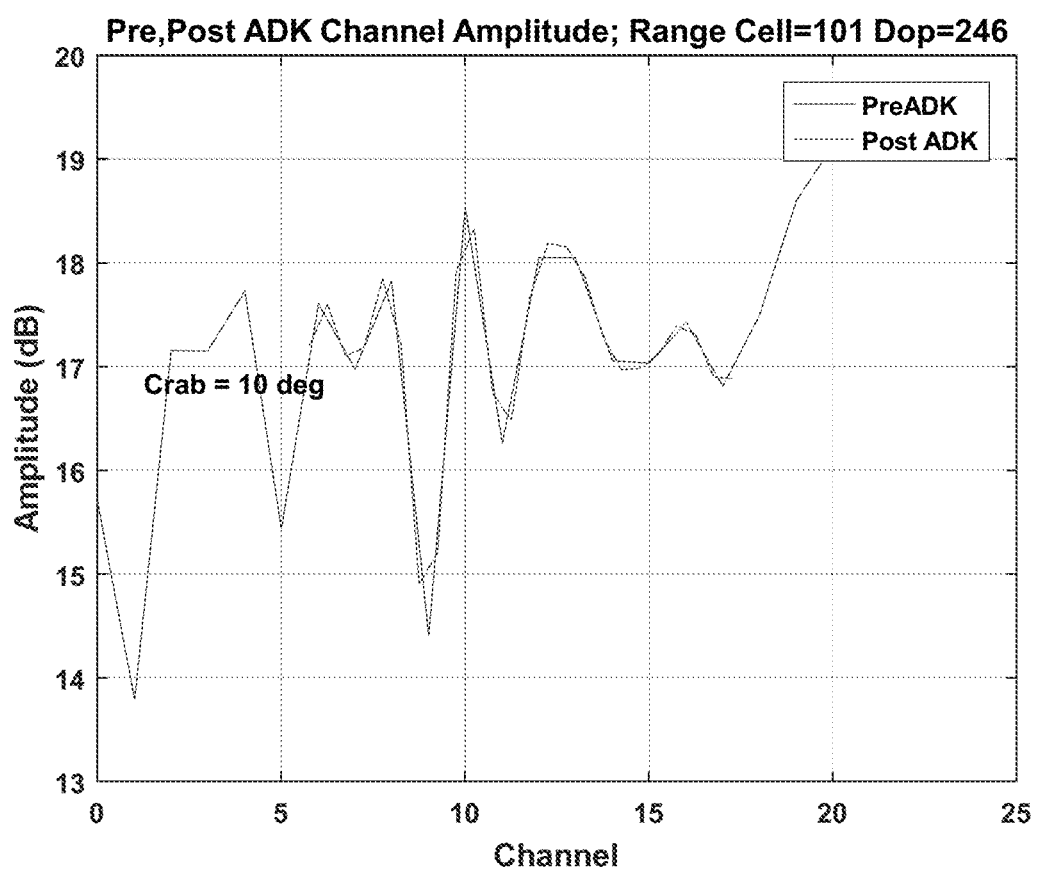
Figure 19:
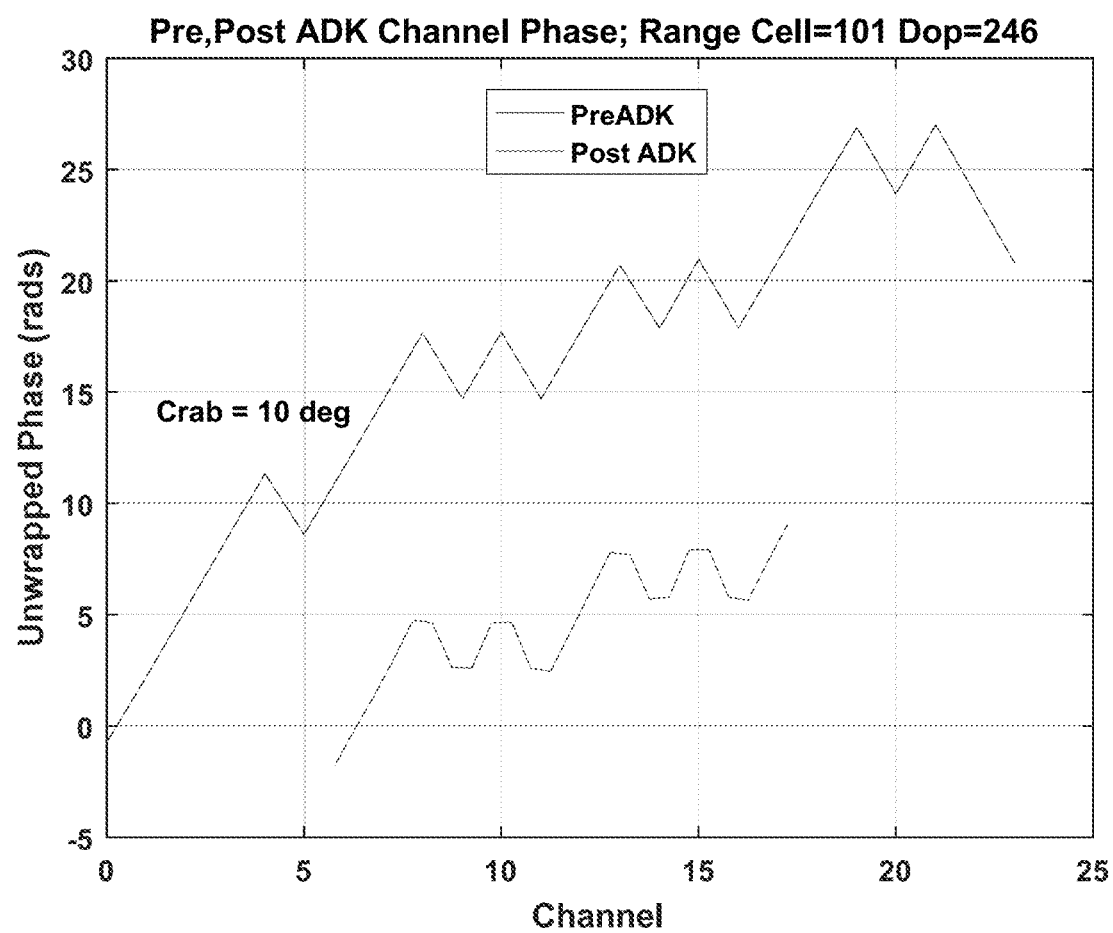
Figure 20:
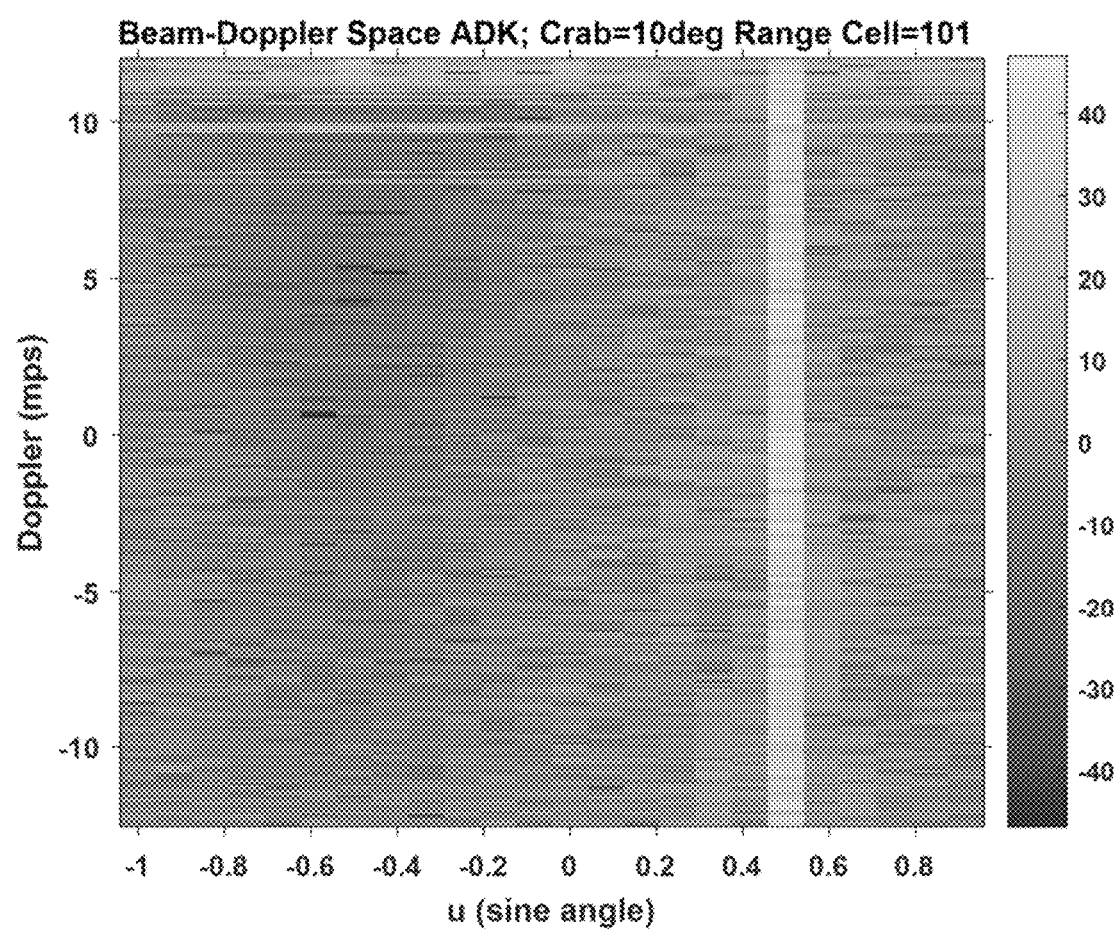
Figure 21:
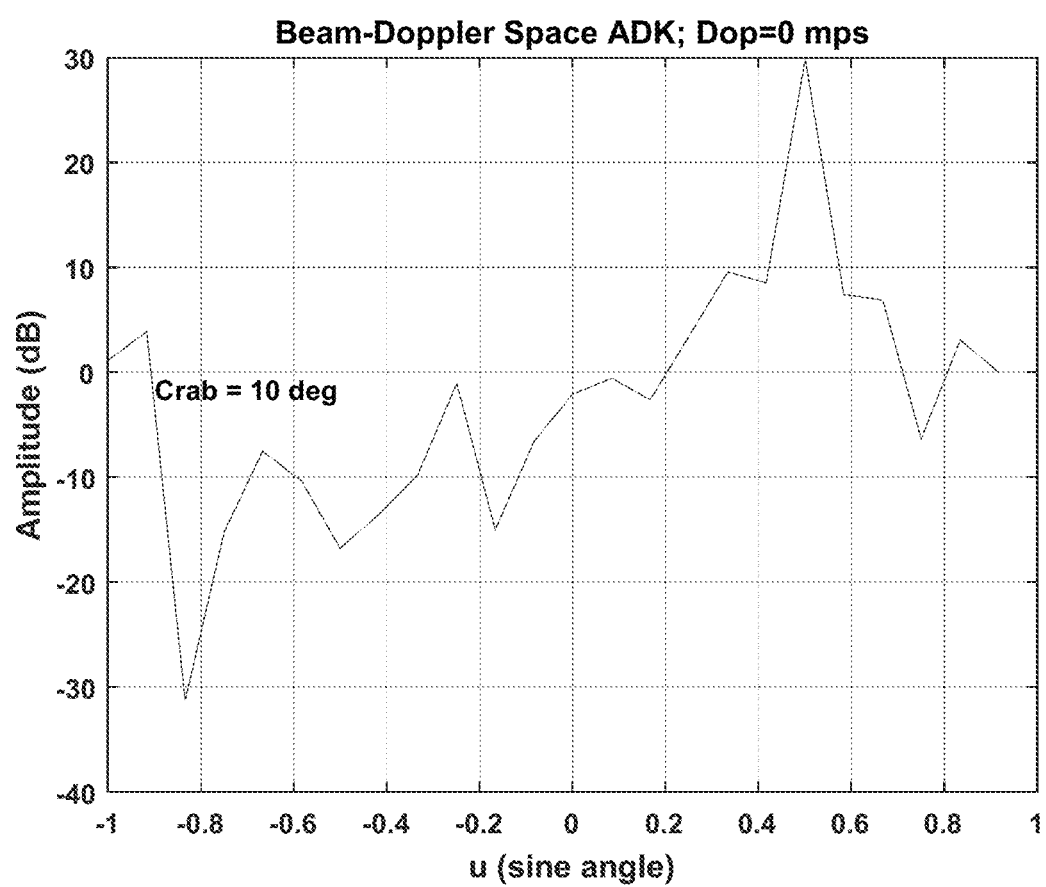
Figure 22:
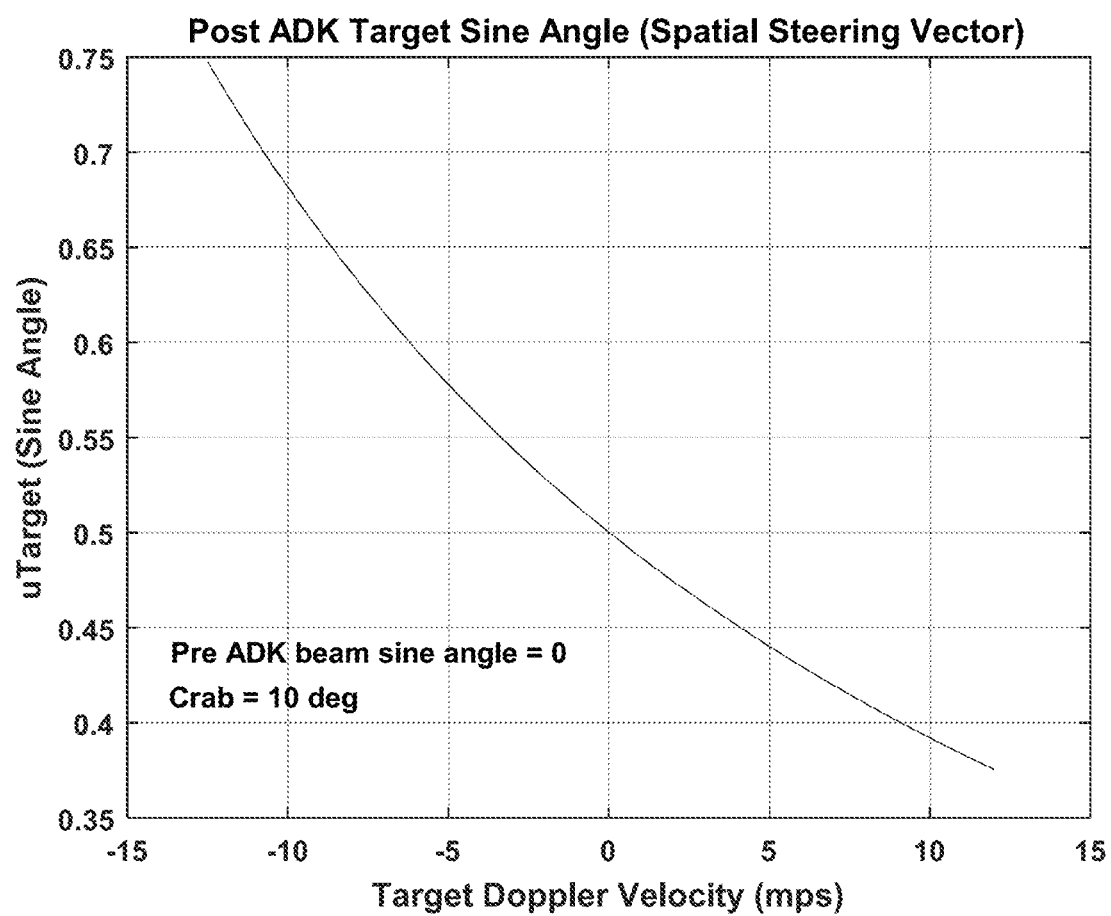
Figure 23:
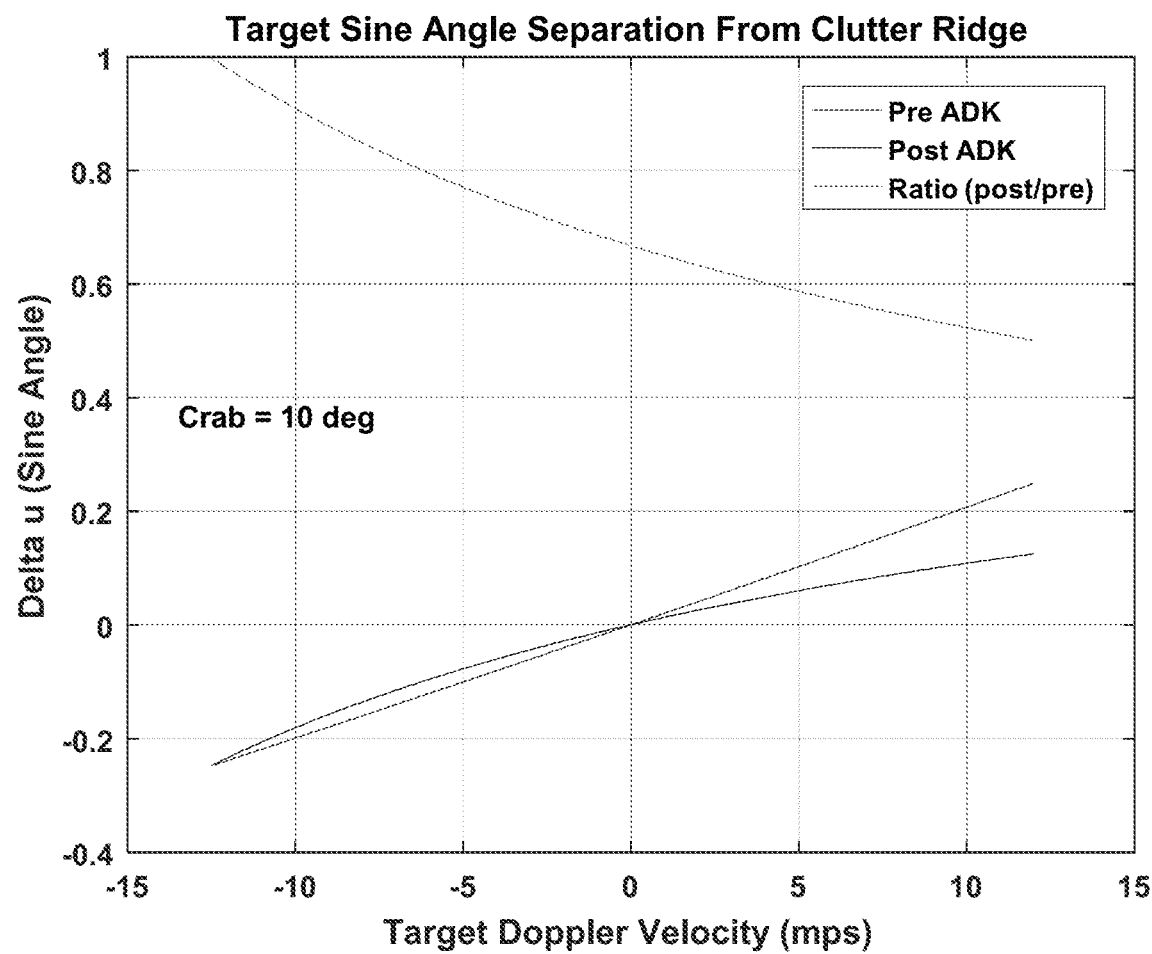
Figure 24:
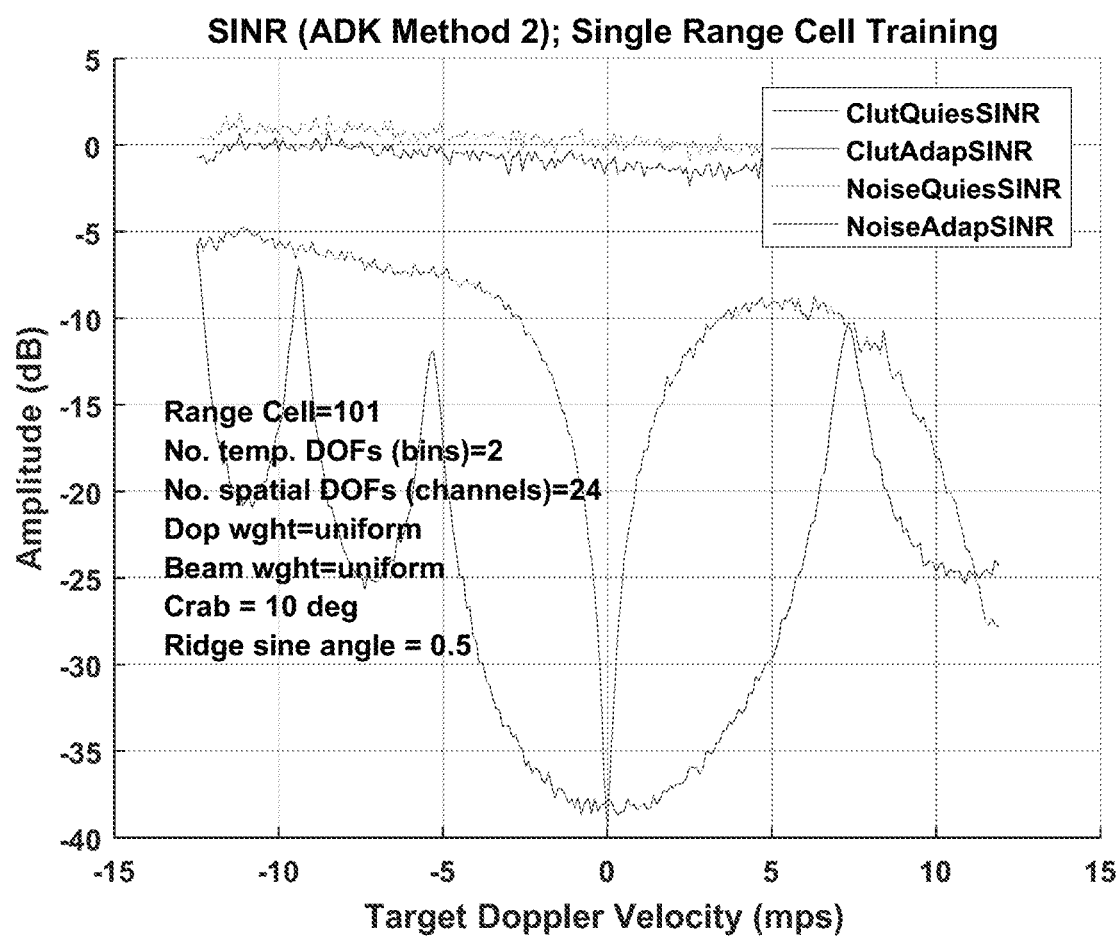
Figure 25:
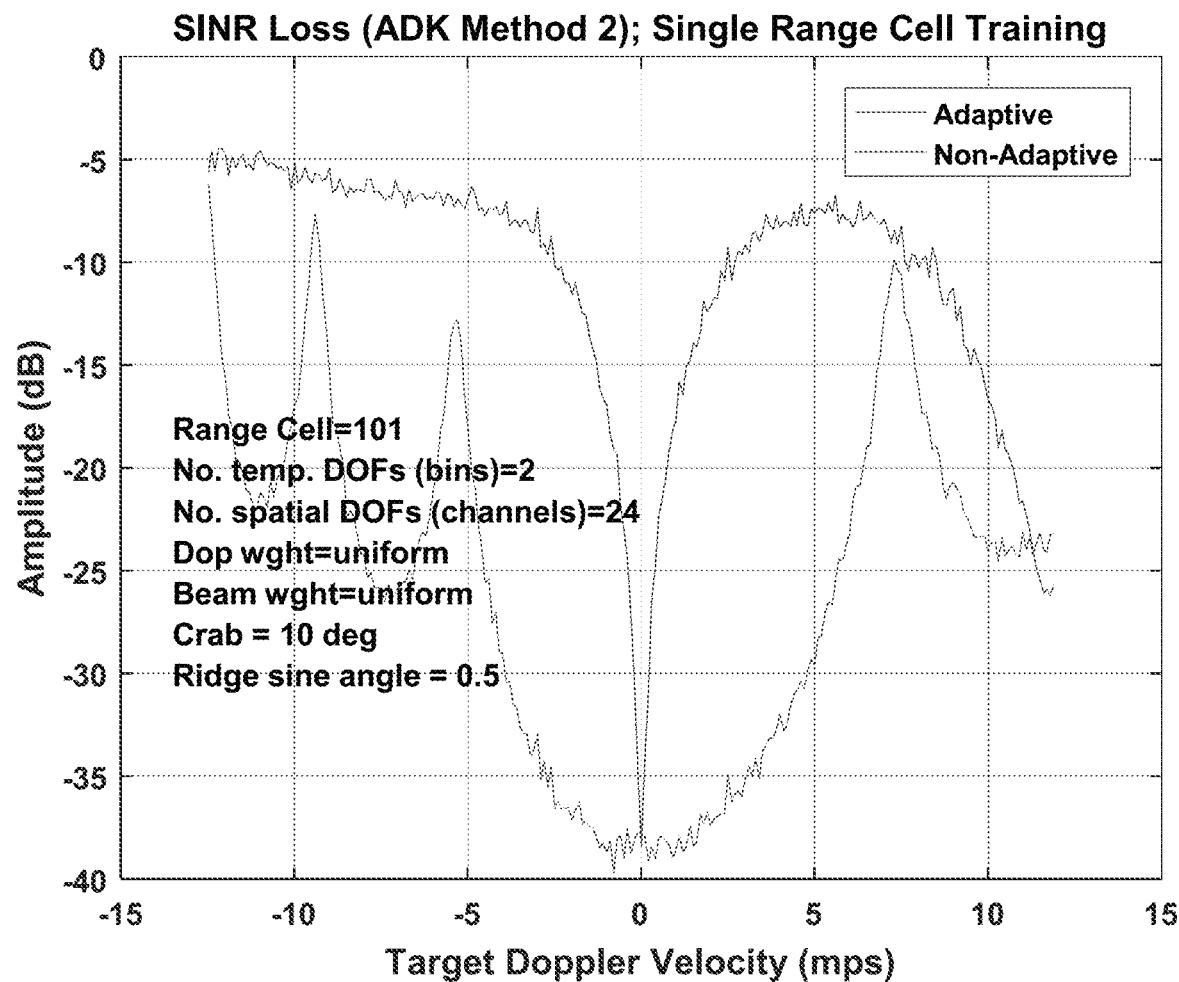
Figure 26:
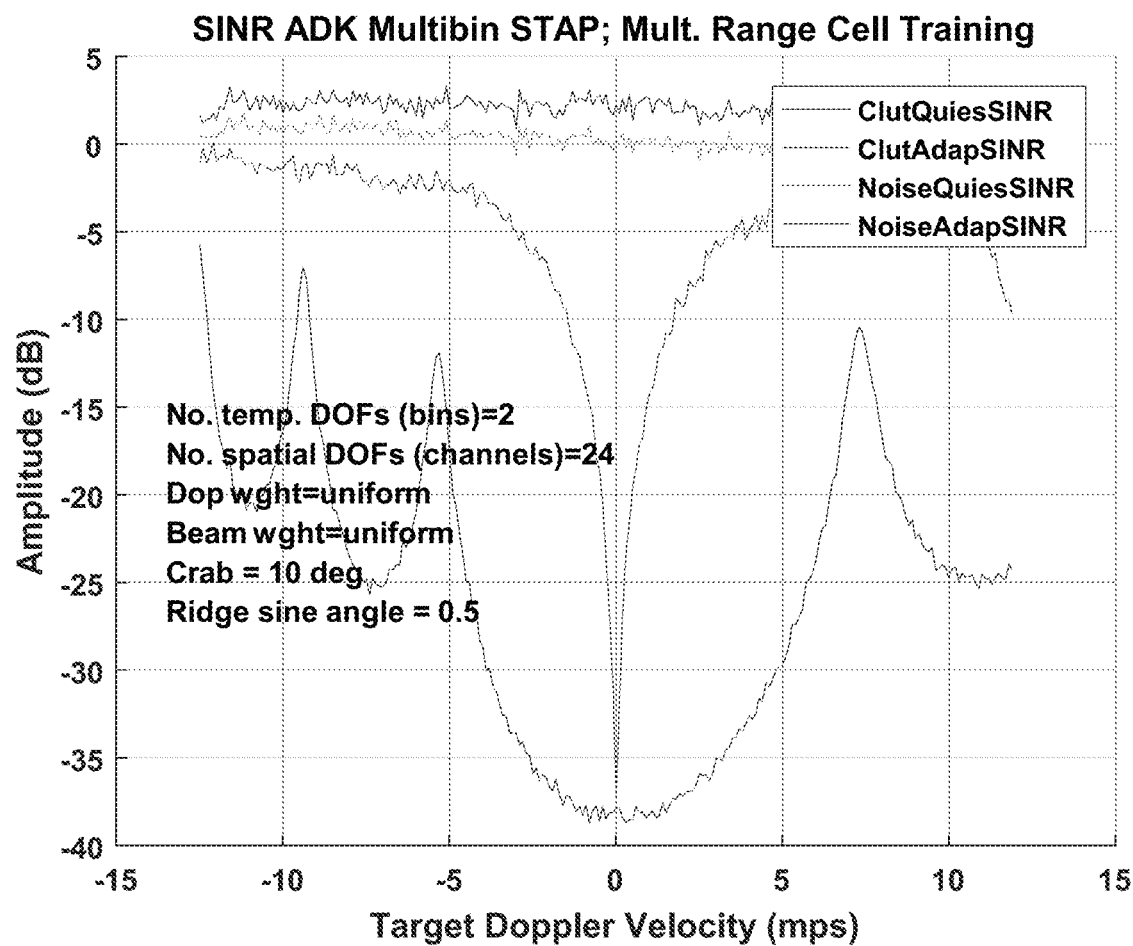
Figure 27:
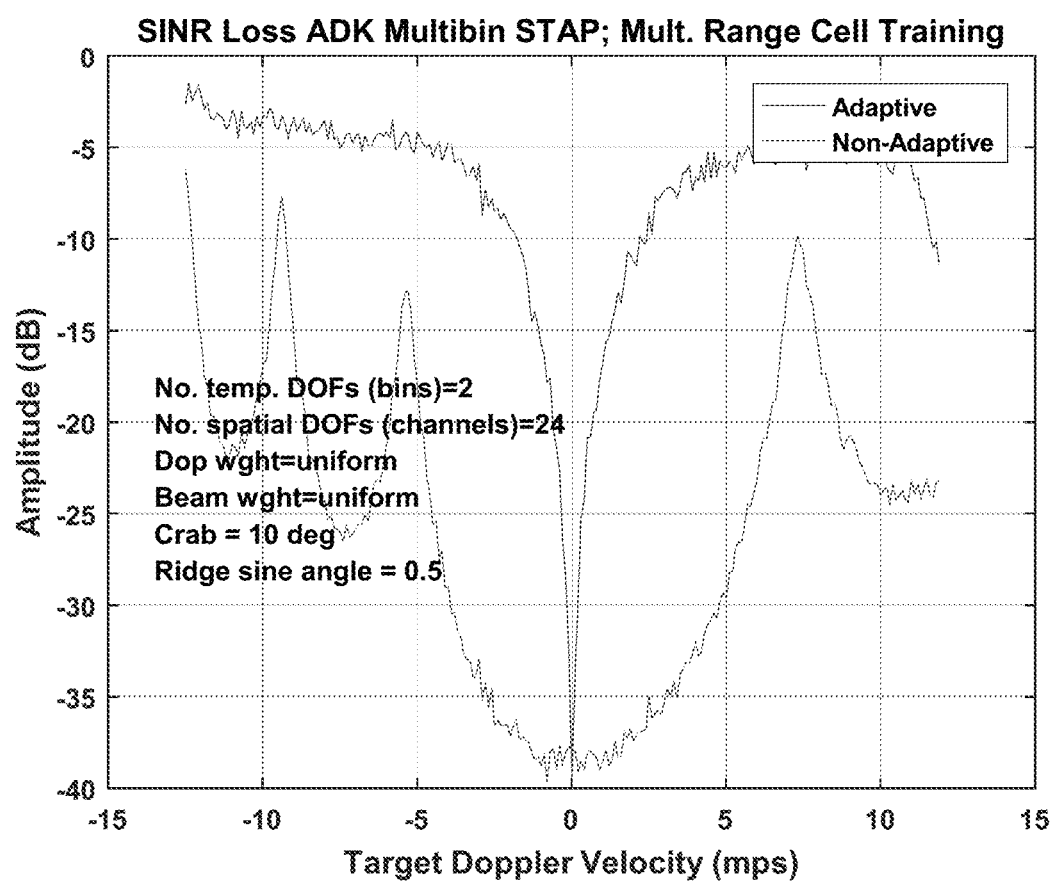
Figure 28:
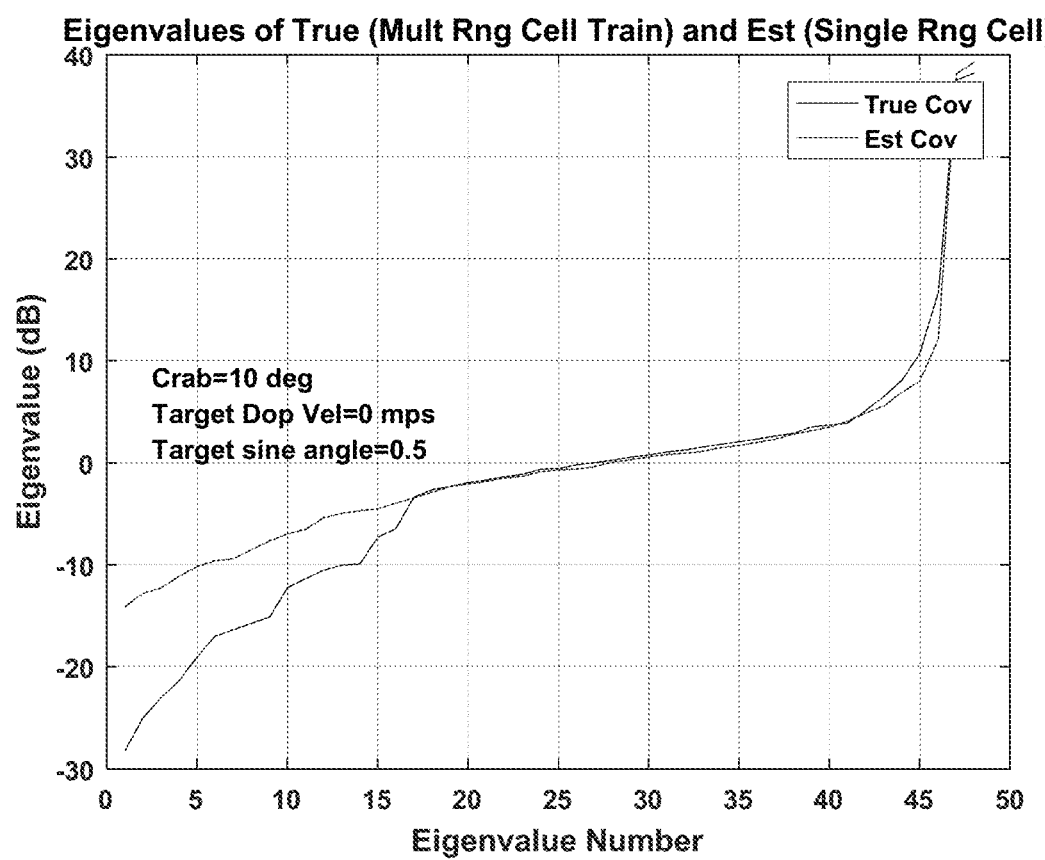
Figure 29:
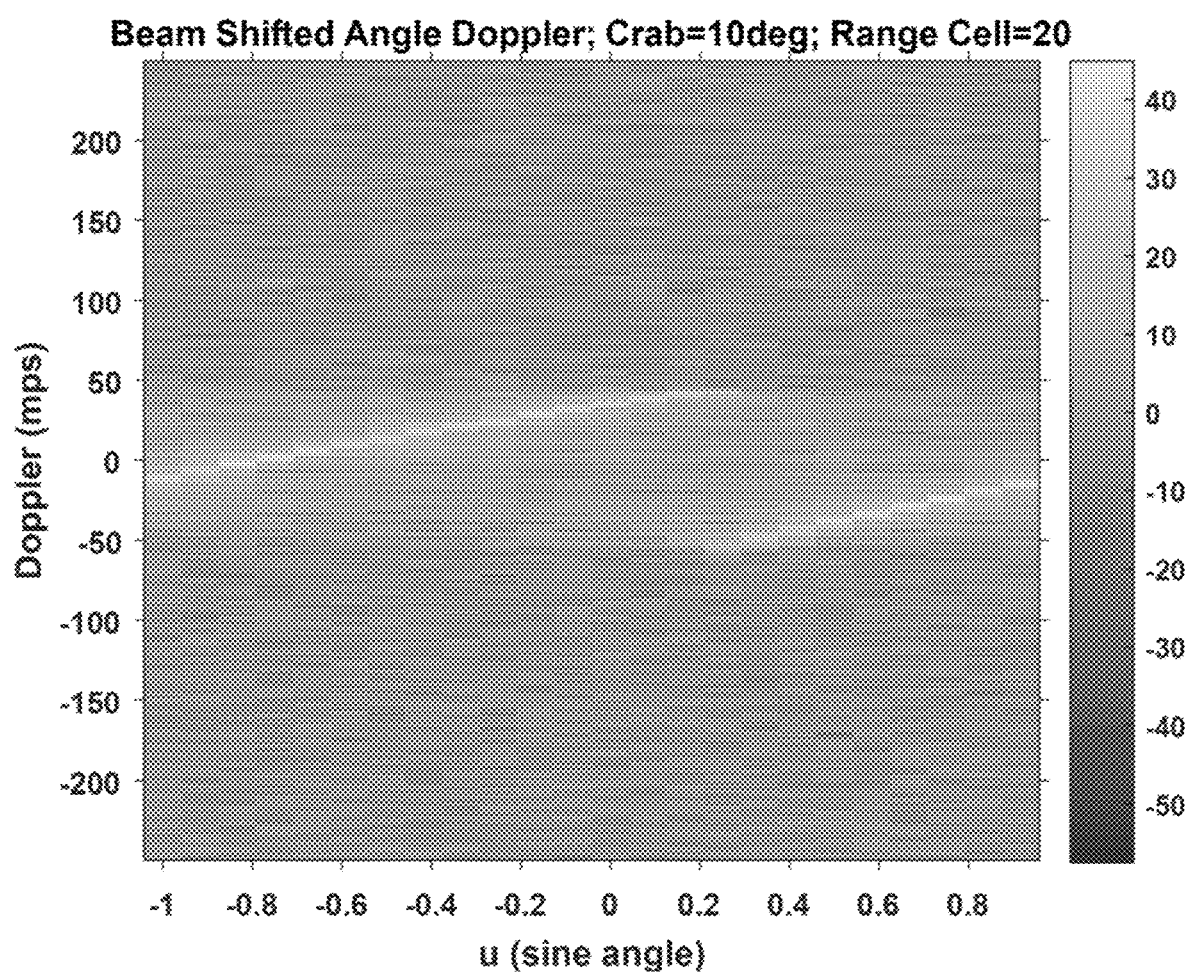
Figure 30:
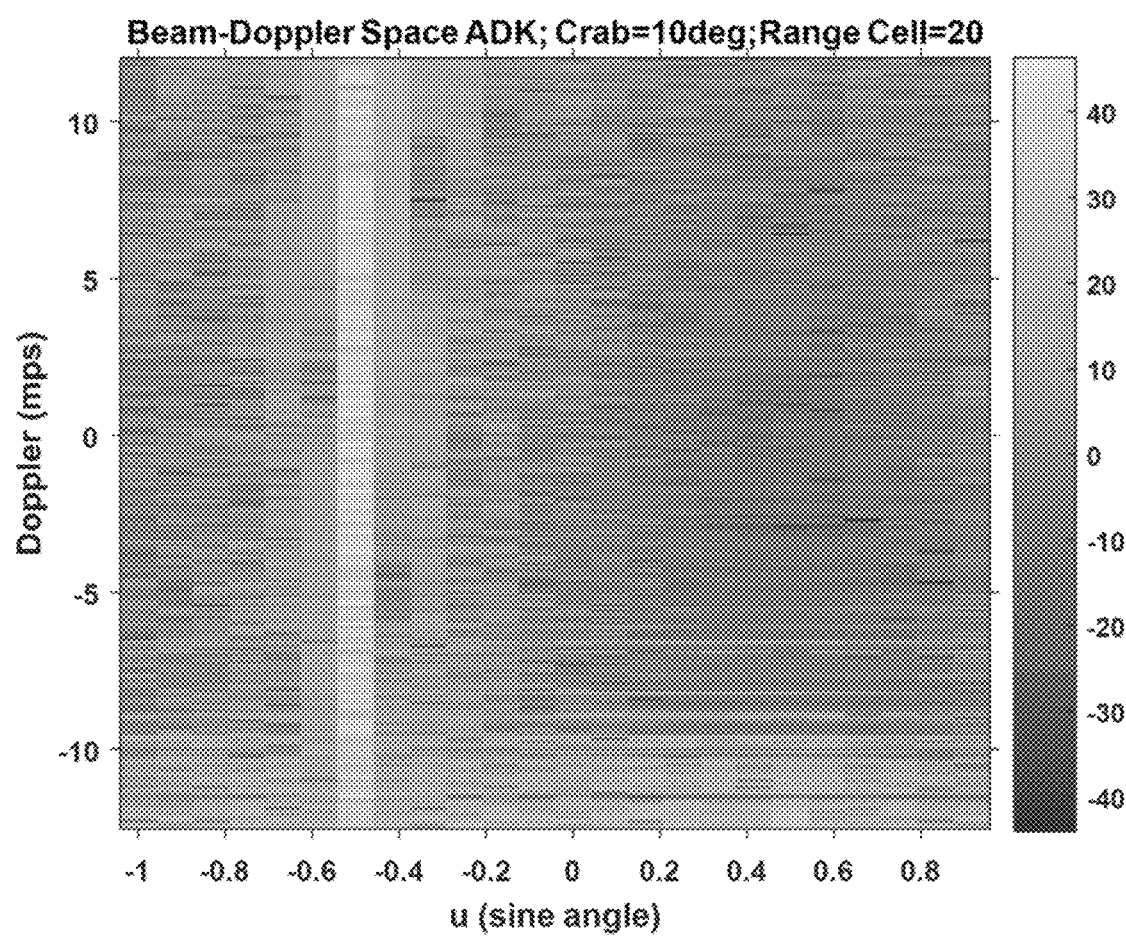
Figure 31:
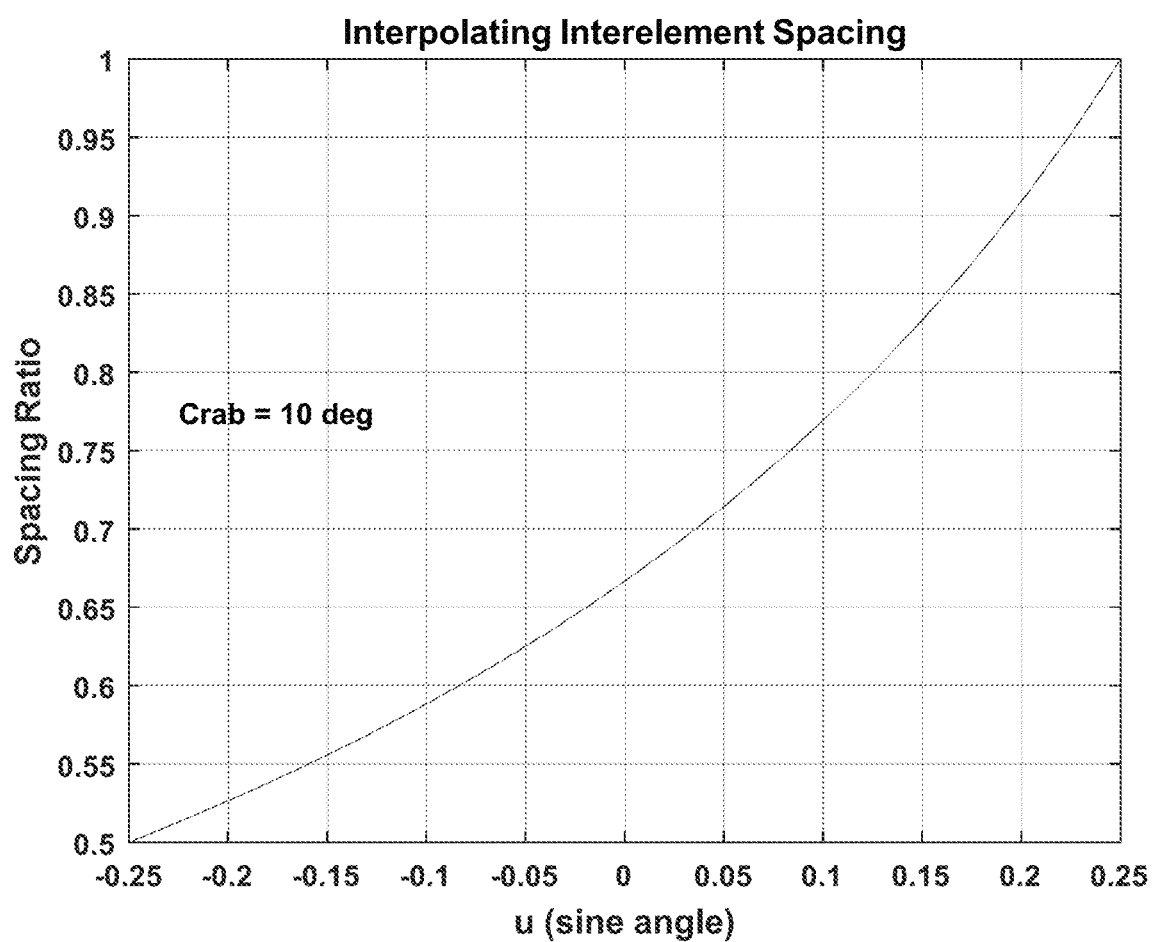
Figure 32:
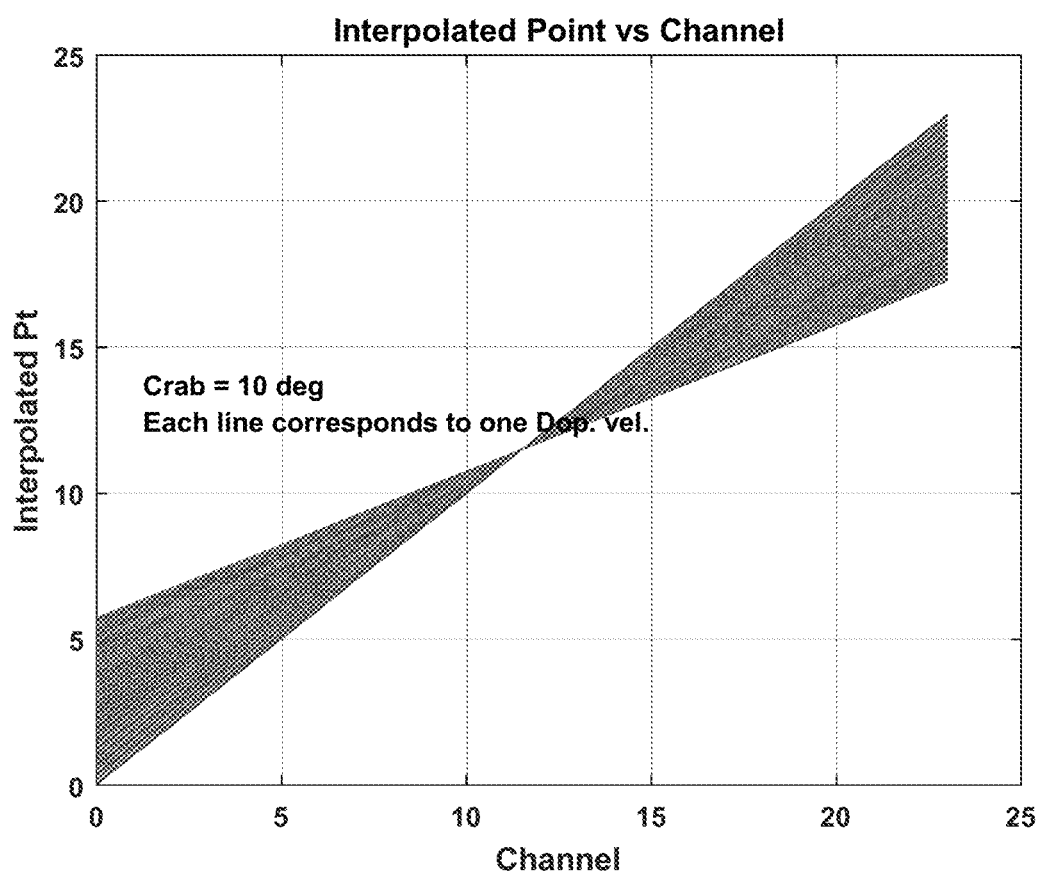
Figure 33:
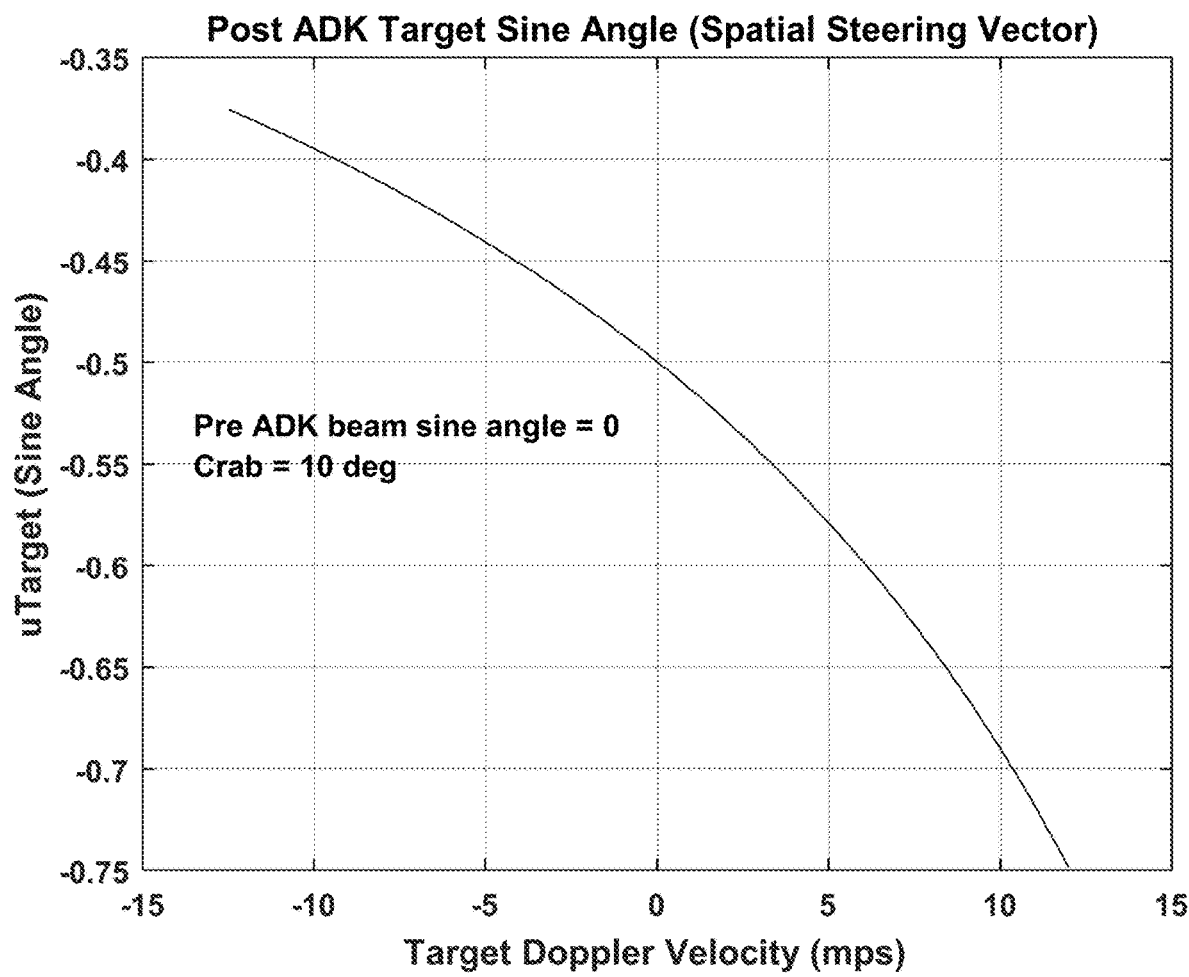

FIG. 10 is a schematic showing Preprocessed Angle-Doppler Response; Crab=10 deg; Range Cell=101;

FIG. 11 is a schematic showing Beam Shifted Angle-Doppler Response; Crab=10 deg; Range Cell=101;

FIG. 12 is a schematic showing Interpolating Interelement Spacing;

FIG. 13 is a schematic showing Interpolated Point vs Channel;

FIG. 14 is a schematic showing Pre-, Post ADK Channel Amplitude; Range Cell=101, Dop=1;

FIG. 15 is a schematic showing Pre-, Post ADK Channel Phase; Range Cell=101, Dop=1;

FIG. 16 is a schematic showing Pre-, Post ADK Channel Amplitude; Range Cell=101, Dop=123;

FIG. 17 is a schematic showing Pre-, Post ADK Channel Phase; Range Cell=101, Dop=123;

FIG. 18 is a schematic showing Pre-, Post ADK Channel Amplitude; Range Cell=101, Dop=246;

FIG. 19 is a schematic showing Pre-, Post ADK Channel Phase; Range Cell=101, Dop=246;

FIG. 20 is a schematic showing Beam-Doppler Space ADK; Crab=10 deg, Range Cell=101;

FIG. 21 is a schematic showing Beam-Doppler-Space ADK; Dop=0 mps;

FIG. 22 is a schematic showing Post ADK Target Sine-Angle (Spatial Steering Vector);

FIG. 23 is a schematic showing Target Sine-Angle Separation from Clutter Ridge;

FIG. 24 is a schematic showing SINR (ADK Method 2); Single-Range-Cell Training;

FIG. 25 is a schematic showing SINR Loss (ADK Method 2); Single-Range-Cell Training;

FIG. 26 is a schematic showing SINR ADK Multibin STAP; Multiple-Range-Cell Training;

FIG. 27 is a schematic showing SINR Loss ADK Multibin STAP; Multiple-Range-Cell Training;

FIG. 28 is a schematic showing Eigenvalues of True (Mult-Rng-Cell Training) and Est (Sing-Rng-Cell Training) Covariance Matrices;

FIG. 29 is a schematic showing Beam Shifted Angle-Doppler; Crab=10 deg; Rng Cell 20;

FIG. 30 is a schematic showing Beam-Doppler Space ADK; Crab=10 deg; Rng Cell 20;

FIG. 31 is a schematic showing Interpolating Interelement Spacing;

FIG. 32 is a schematic showing Interpolated Point vs Channel;

FIG. 33 is a schematic showing Post ADK Target Sine-Angle (Spatial Steering Vector)

Figure 34:
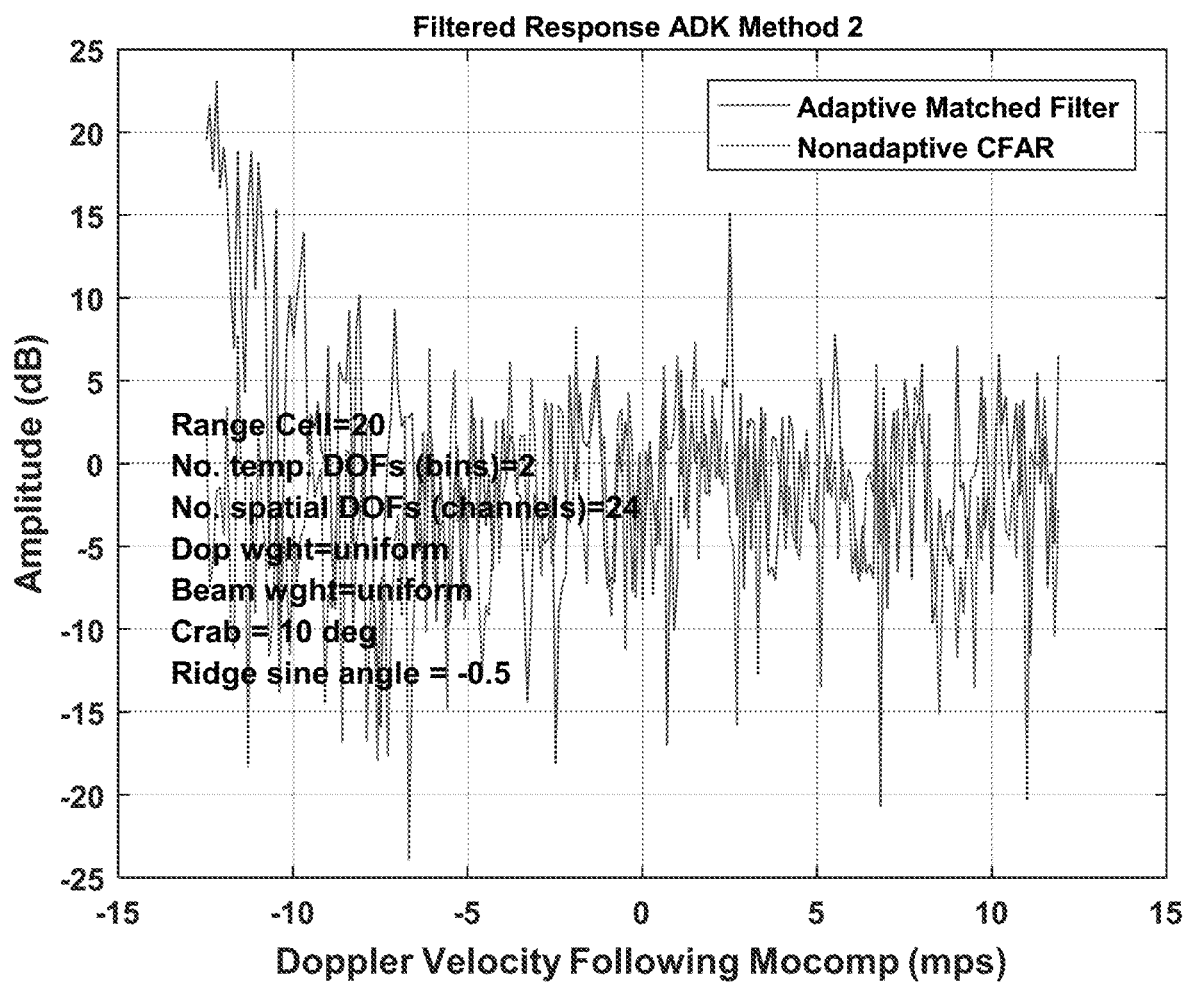
Figure 35:
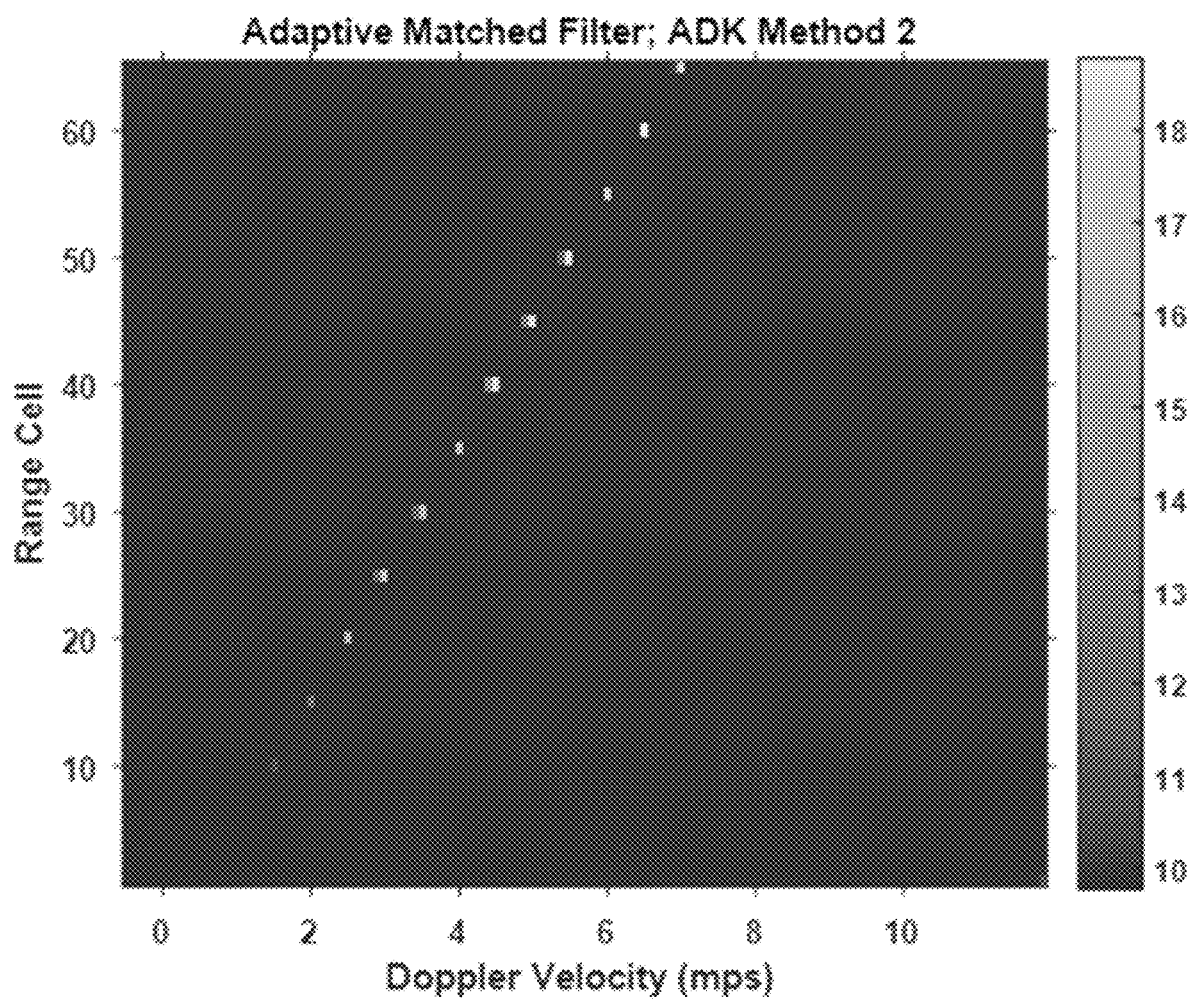
Figure 36:
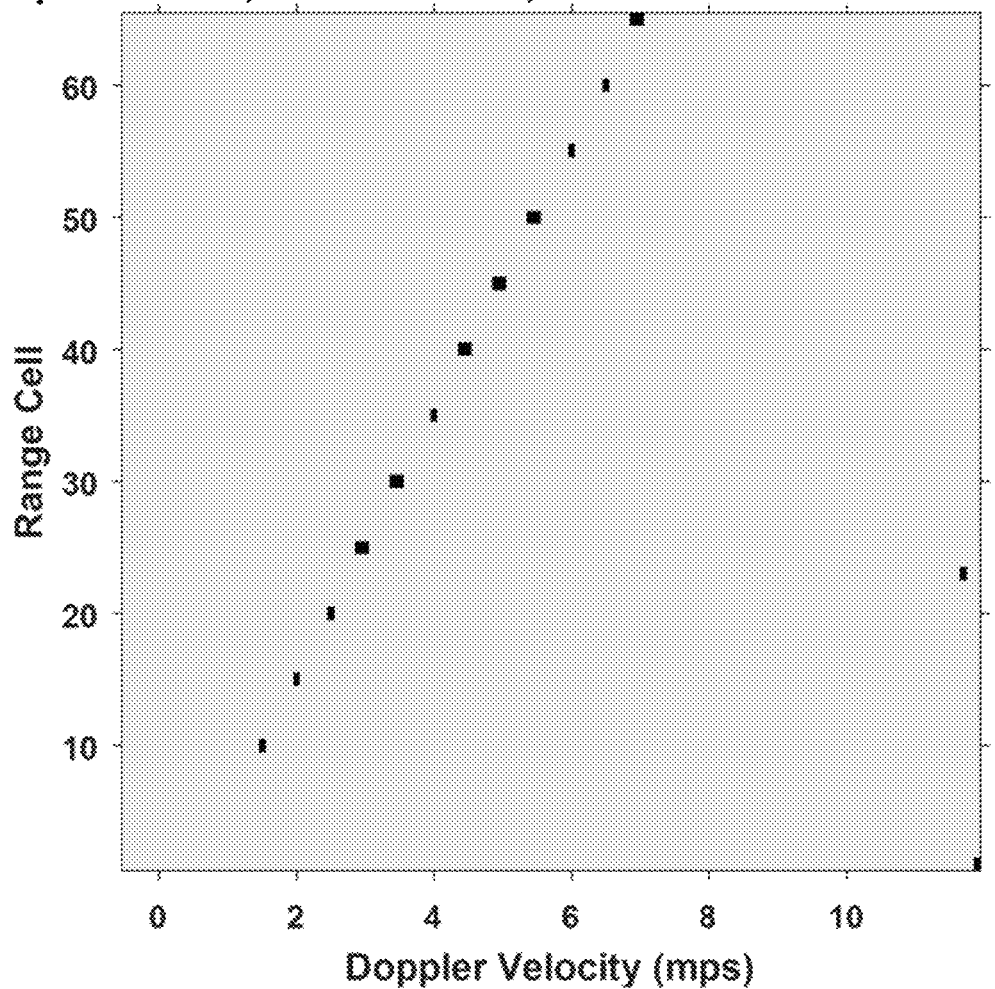
Figure 37:
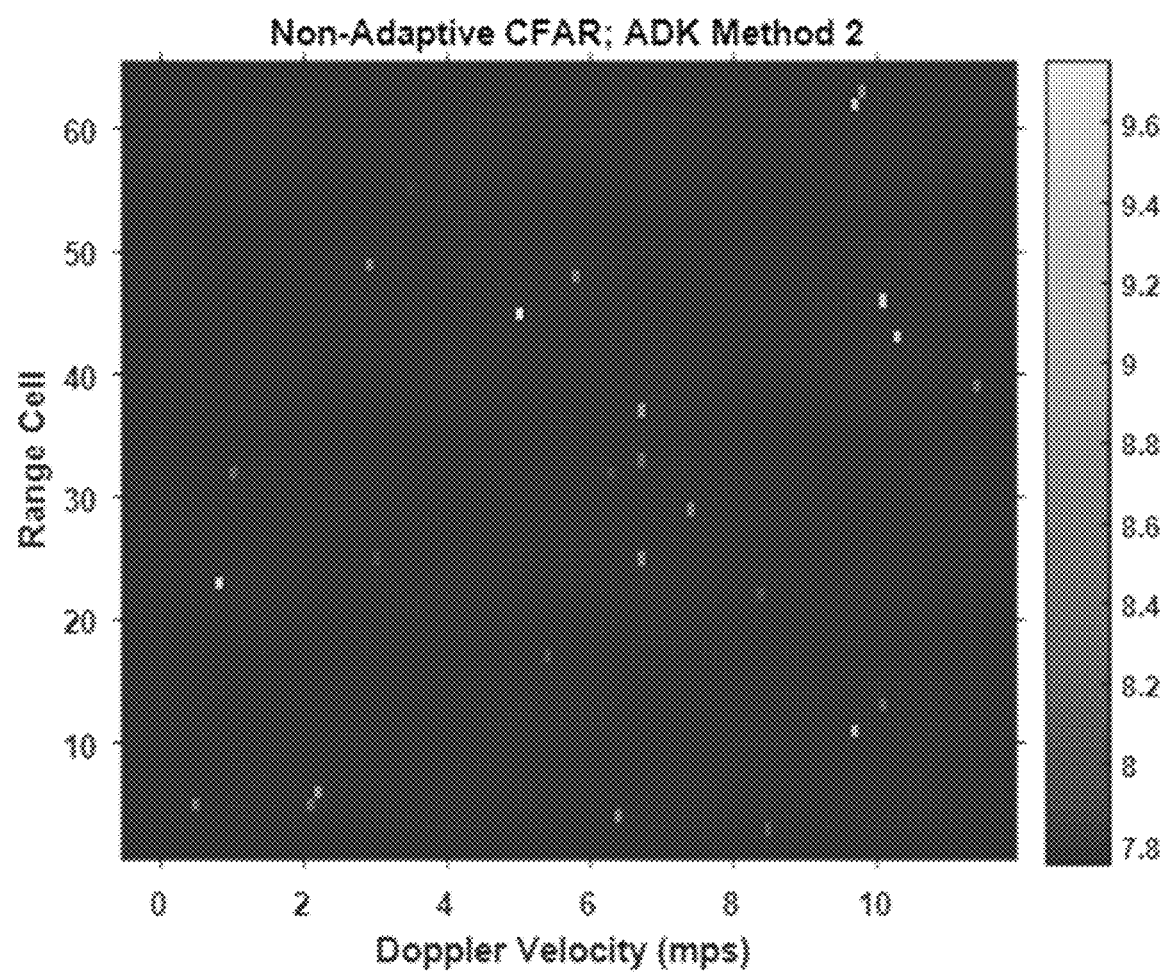
Figure 38:
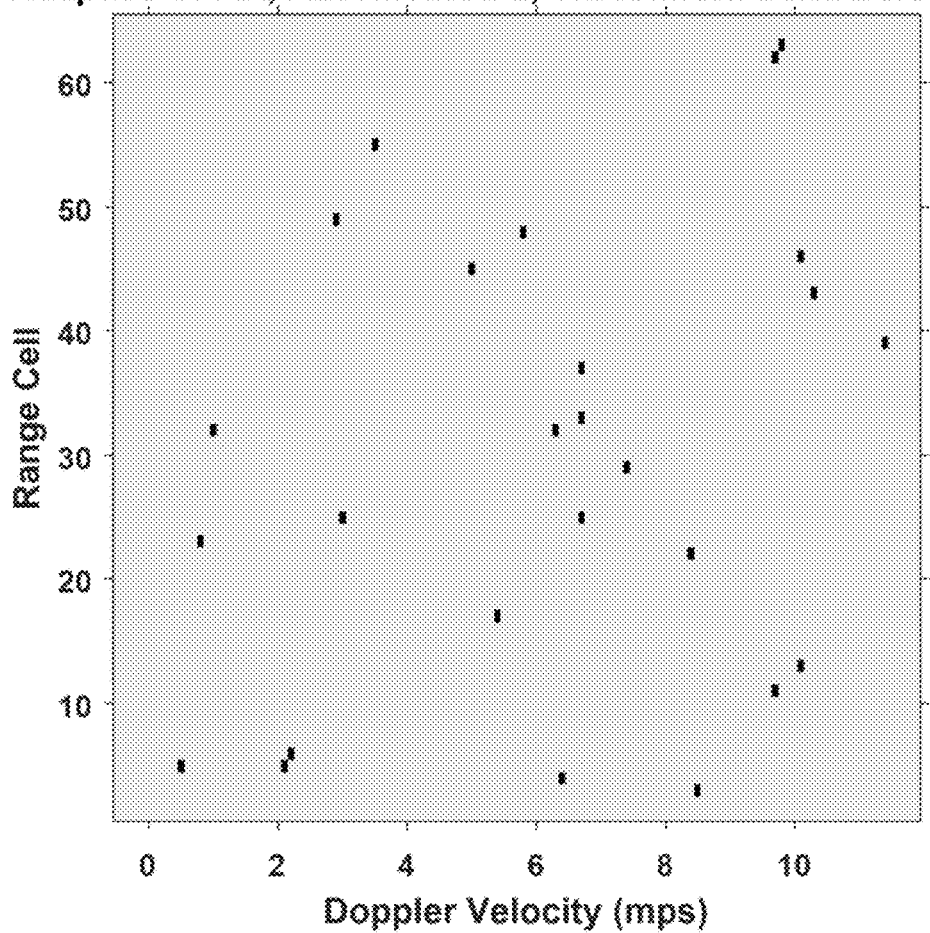
Figure 39:
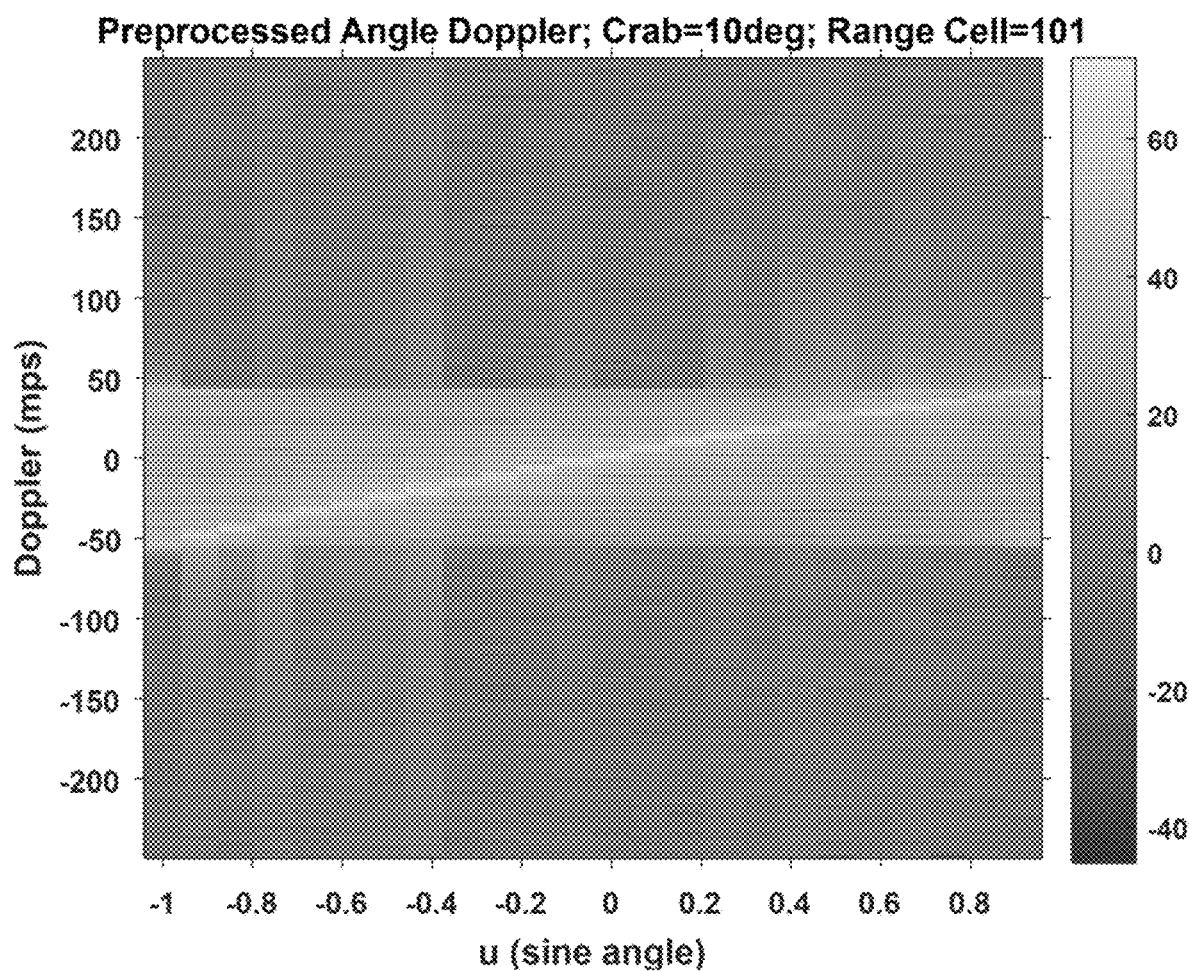
Figure 40:
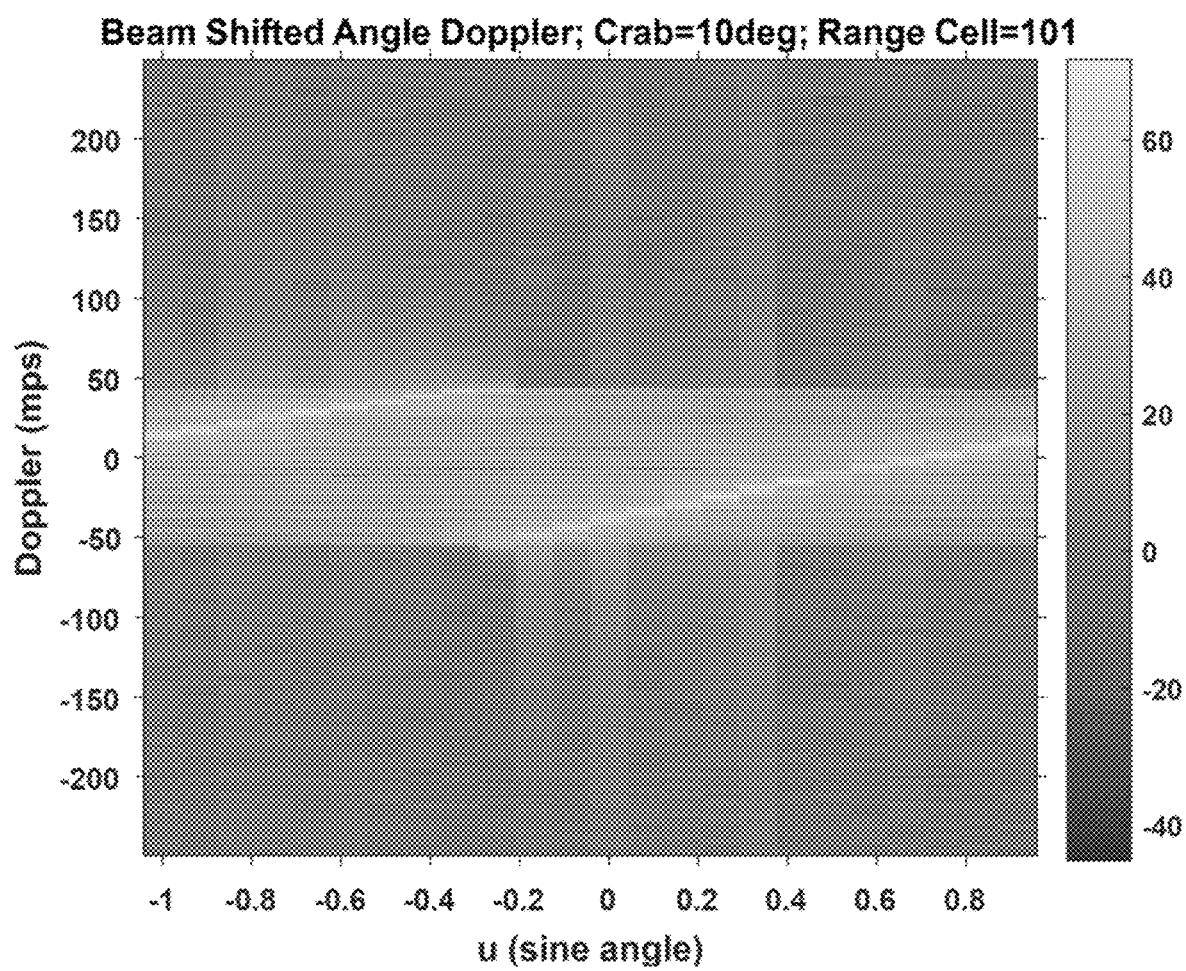
Figure 41:
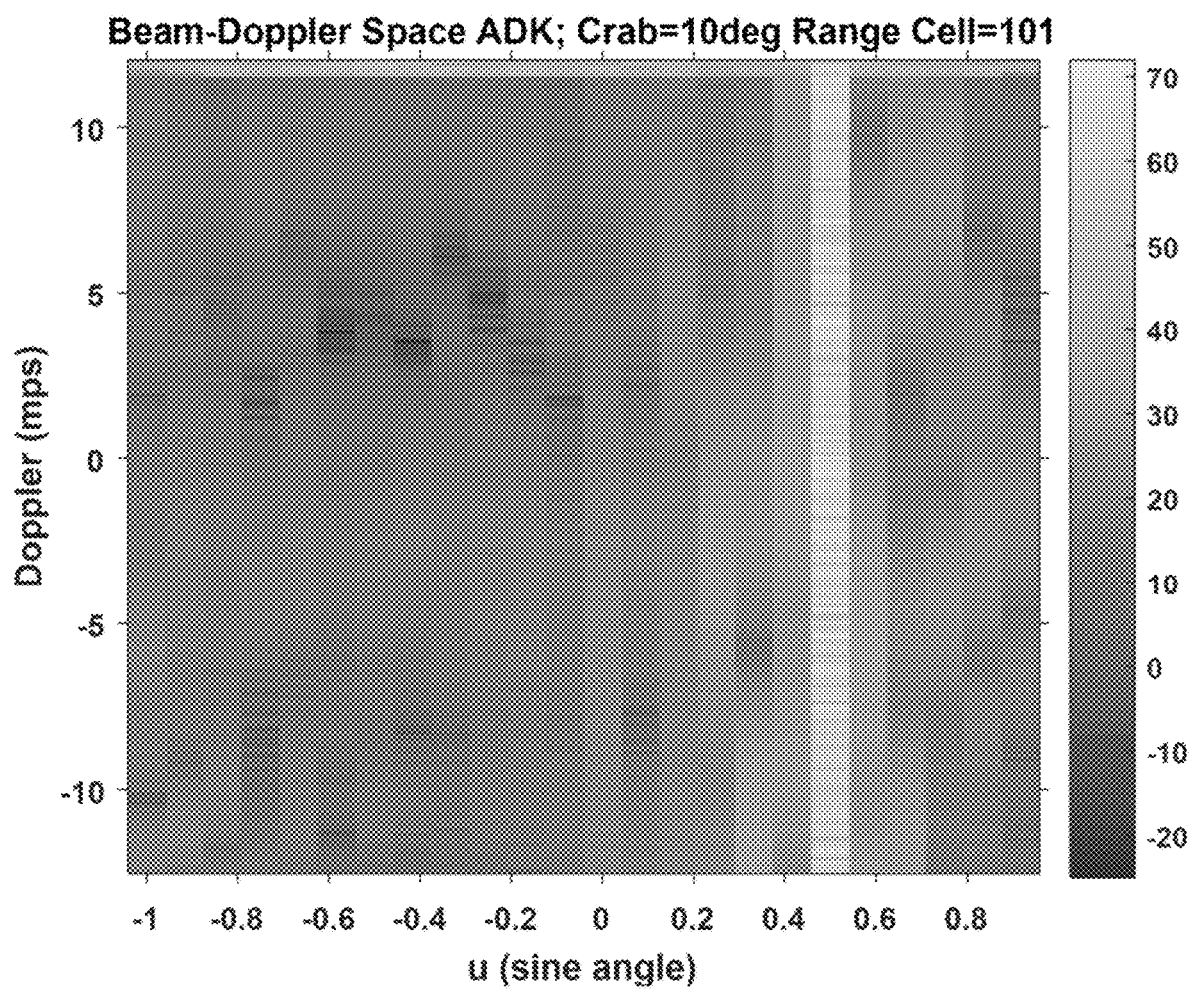
Figure 42:
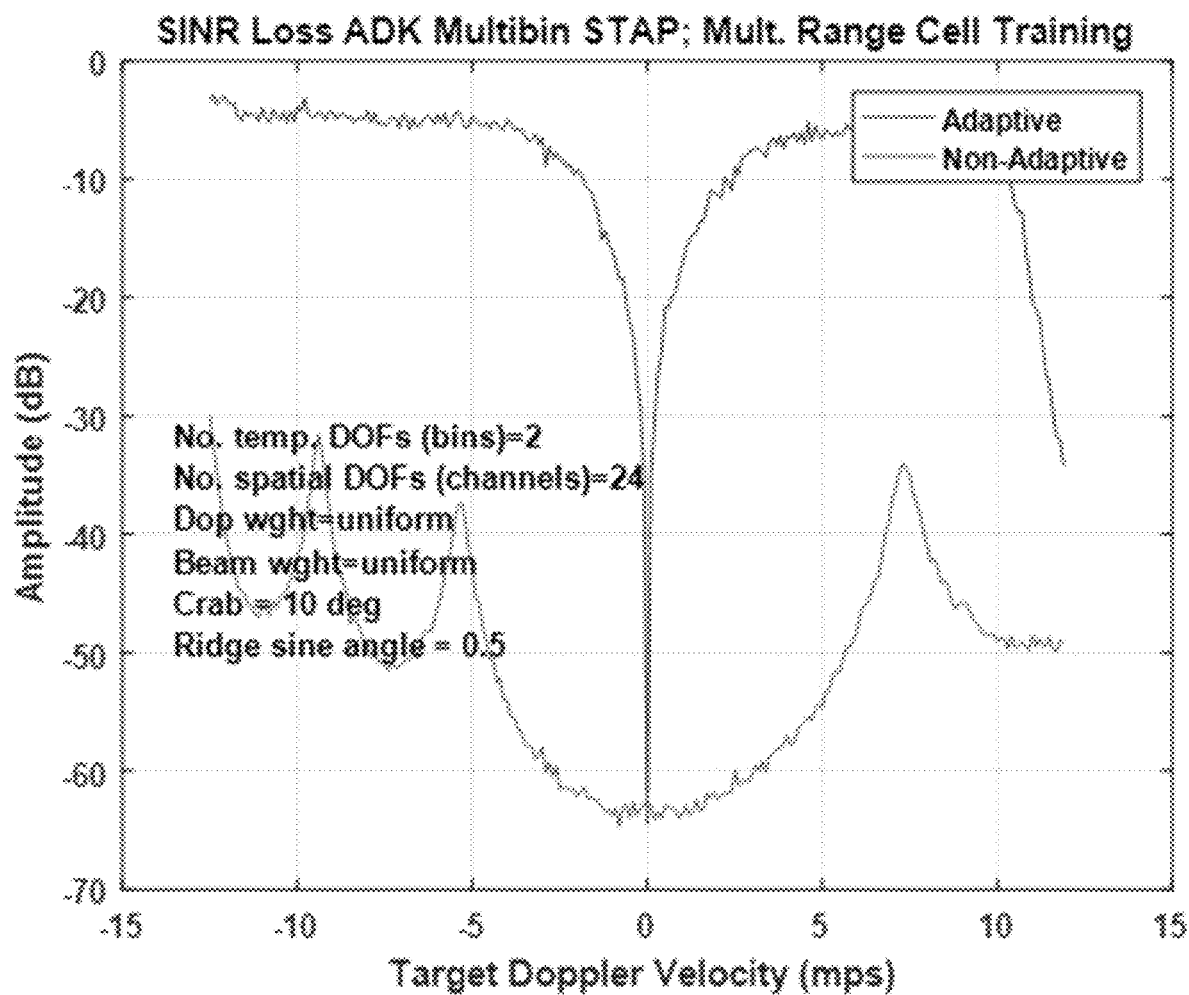
Figure 43:
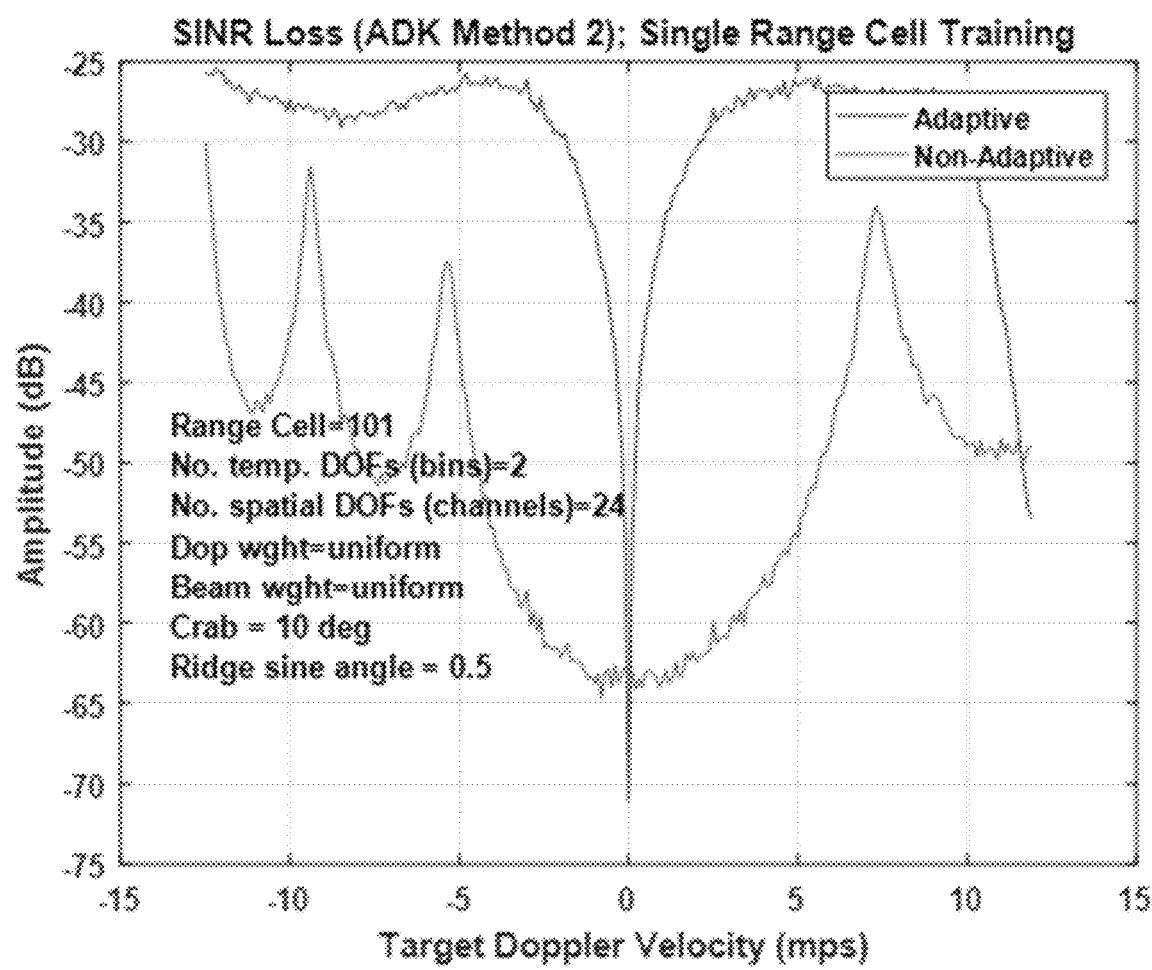
Figure 44:
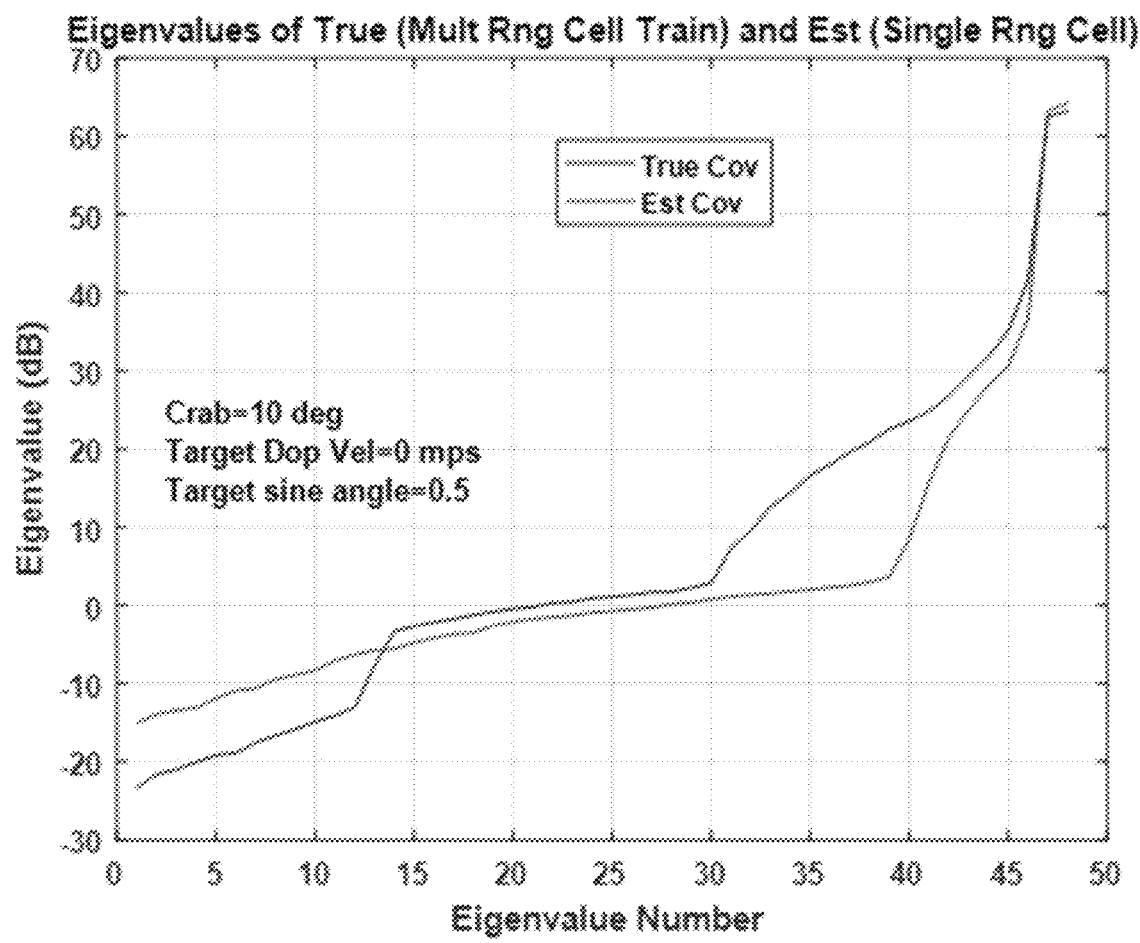

FIG. 34 is a schematic showing Filtered Response ADK Method 2;

FIG. 35 is a schematic showing Adaptive Matched Filter; ADK Method 2;

FIG. 36 is a schematic showing Adaptive Matched Filter; ADK Method 2; Threshold 9 dB below Peak;

FIG. 37 is a schematic showing Non-Adaptive CFAR; ADK Method 2;

FIG. 38 is a schematic showing Non-Adaptive CFAR; ADK Method 2; Threshold 9 dB below Peak;

FIG. 39 is a schematic showing Preprocessed Angle Doppler; Crab=10 deg; Range Cell 101;

FIG. 40 is a schematic showing Beam Shifted Angle Doppler; Crab=10 deg; Range Cell 101;

FIG. 41 is a schematic showing Beam-Doppler Space ADK; Crab=10 deg; Range Cell 101;

FIG. 42 is a schematic showing SINR Loss ADK Multibin STAP; Multiple Range Cell Training;

FIG. 43 is a schematic showing SINR Loss Multibin STAP; Single Range Cell Training; and FIG. 44 is a schematic showing Eigenvalues of True (Mult Rng Cell Train) and Est (Single Rng Cell Train) Covariance Matrices.

DETAILED DESCRIPTION OF THE INVENTION

Figure 1:
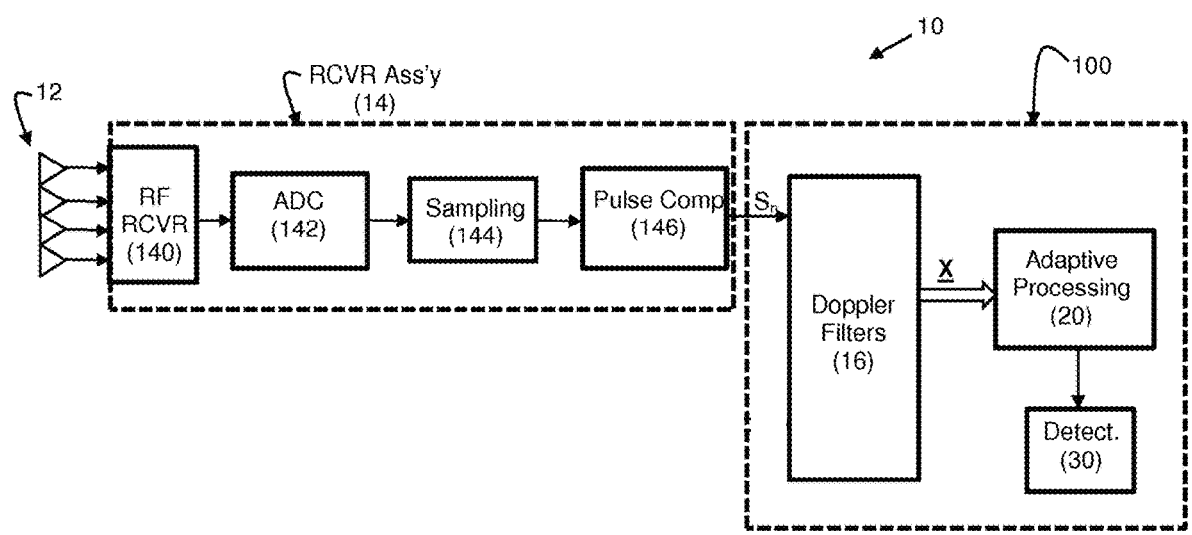
FIG. 1 is a schematic of a radar system configured to implement ADK according to the present invention.

Referring to the figures, wherein like numeral refer to like parts throughout, there is seen in FIG. 1 a radar system 10 that is configured to transform the "clutter ridge," which identifies the dependence of clutter on angle and Doppler within a range cell, to a vertical line (i.e., a constant angle)

for detecting targets with airborne (or space borne) multichannel radars according to the present invention. This approach is preferred for large coherent processing intervals (CPIs) and reasonably sized antenna apertures. The radar system can be manned or unmanned and the present invention is particularly applicable to side looking radar where an array antenna is side mounted on a moving platform and the array horizontal axis generally is aligned with the velocity vector.

Radar system 10 generally comprises a multichannel antenna 12 coupled to a receiver assembly 14. The receiver assembly 14 includes an RF receiver 140 that is typically configured to downconvert, amplify, and filter the RF signals captured by multichannel antenna assembly 12. The downconverted signals are provided to an analog-to-digital converter (ADC) 142 and sampler 144 to provide in-phase and quadrature signal components to a pulse compressor 146. At this point, a digital signal Sn is provided to Doppler filters 16 in adaptive processing portion 100 for adaptive processing 20 and detection 30 using the ADK approach described herein.

It should be understood, however, that radar system 10 is merely provided as one embodiment of a radar system with which the ADK approach described herein may be used and that any suitable radar system may be used. In general, it should be understood that radar systems configured to perform STAP processing may be used.

One application of ADK according to the present invention is single-range-cell training. As an example, the training data for STAP covariance matrix estimation is readily obtained from the large number of Doppler bins available in the data pertaining to the test range cell. The advantage introduced stems from the potential in some scenarios for the statistical homogeneity of Doppler bins to be superior to that of range bins. In general, some combination of Doppler bin and range cell training may prove optimal in this regard. The point is that ADK nicely introduces a second dimension of flexibility in generating suitable training data.

The clutter ridge can be transformed from virtually any shape, including for example that of platform "crabbing" (misaligned velocity vector and antenna array axis) to vertical (constant angle) or horizontal (constant Doppler). Vertical alignment is preferred for operation with long CPIs. There are two benefits to ADK according to the present invention. First, the option of single range cell processing where, for example, training is conveniently carried out over Doppler instead of the conventional range. Early simulations indicate that this option is limited to larger cross section targets where signal-to-noise ratio (SNR) is not less than about 20 dB below clutter-to-noise ratio (CNR). Also the Doppler spectrum would be tapered by the transmit beam pattern and this would contribute to heterogeneous clutter statistics over a range of Doppler bins that would diminish the effectiveness of ADK and must be kept in mind. As a minimum, though, Doppler training can be combined with multiple-range-cell training to significantly reduce the number of range cells needed for parameter estimation.

Second, for multiple-range-cell training, ADK can, for example, vertically align the clutter ridge of each training range cell even if the ridges derive from differing geometries. Stationarity between training range cells is thus improved. This benefit is especially relevant to bistatic radar. It is also relevant to monostatic radar scenarios of relatively small range-to-altitude-ratio geometries.

With ADK, the ridge must be shifted in Doppler velocity if the small CPI option is employed or in angle if the large CPI option is employed. Consider the shift in angle. The shift can be positive or negative about broadside. A negative shift is best for detecting a relatively large range of positive Doppler velocity targets. A positive shift is best for negative Doppler velocity targets. These shifts may be opposite if the definitions of Doppler velocity and angle coordinates differ from those applied here, but the point is that the detection processing may need to be carried out twice to maximize the range of velocities of detectable targets.

In the simulations described herein, the "true" covariance matrix applied in single-range-cell training SINR Loss is that approximated by the sample covariance obtained with a large number of range cells. This was reasonable because the simulation maintained complete statistical stationarity of clutter between range cells.

Figure 2:
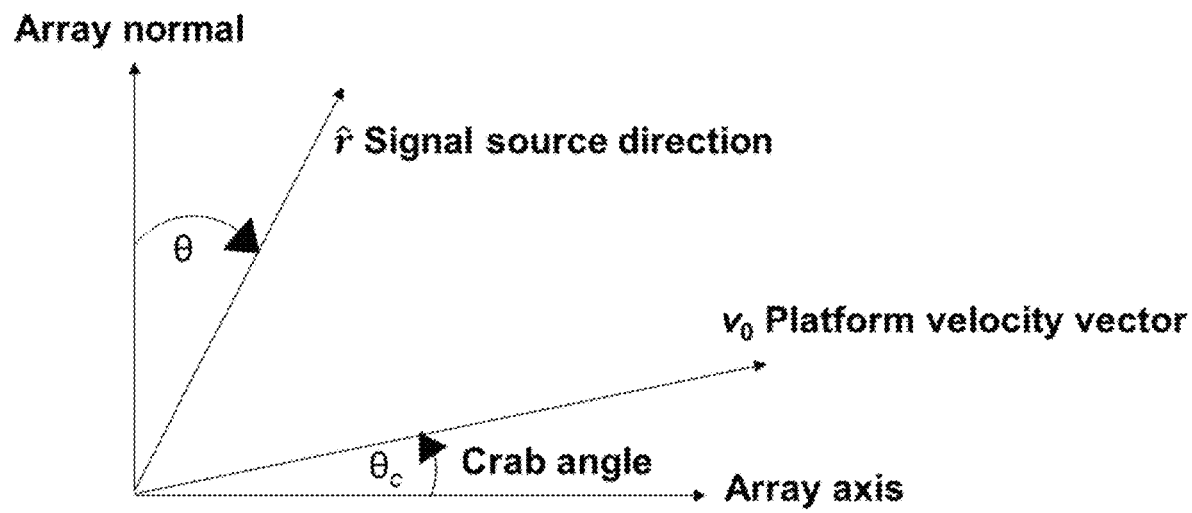
FIG. 2 is a schematic showing Geometry of Moving Platform Containing Antenna Array.

FIG. 2 shows the geometry of a crabbing platform. The Doppler velocity of the clutter ridge as a function of u=sin (θ) where θ denotes the complement of the cone angle (referenced positive towards the front of the platform) is approximated by:

$$v_m = v_0(u_m \cos \theta_c + (1-u_m^2)^{0.5} \sin \theta_c)$$

where $\theta_c$ denotes the crab angle (referenced clockwise with respect to the antenna axis). This relation is accurate for large range-to-altitude ratios and is assumed here only for illustration (ADK applies generally to any clutter ridge function).

A collected data cube typically contains data in three dimensions: "fast-time" sample, PRI (or pulse), antenna array element (or channel). First, the sampled data in each channel and for each PRI is transformed to the frequency domain. Each resulting spectral component (or subband) of the clutter signal then is processed separately. For simplicity, consider the $p^{th}$ spectral component. There are two methods of implementing ADK: interpolating data in the slow-time (pulse-to-pulse) domain and interpolating in the spatial (channel) domain. The first approach is most effective for relatively small CPIs and relatively large apertures because then the portion of the ridge masking the target is localized in angle by the antenna main lobe and Doppler domain adaptivity is reasonably effective. For relatively large CPIs and relatively small apertures, the second approach may be best and is thus discussed in detail below.

As indicated, the second approach interpolates in the spatial (channel) domain. First, the PRI dimension of the data is transformed into Doppler bins. The component of clutter signal in the $n^{th}$ element (or subarray) channel corresponding to scattering from a patch of ground located in the $m^{th}$ bin, at sine-angle $u_m$, then is given by $$c'(p, m, n) = B_p(m, n)\exp\left(j\frac{2\pi f_p}{\lambda_0 f_0} u(v_m) n d\right)$$

where d denotes the channel spacing and $u(v_m)=u_m$ is given by the inverse of Equation (1). An equation for the inverse may be difficult to determine in which case an adequate inverse can be determined by creating a suitable table. Also, $f_p$ denotes the pth spectral frequency, and $f_0$ and $\lambda_0$ correspond to the carrier frequency. The area of the patch of ground contributing to this response is given largely by the product of two coordinate lengths: the down range length and the cross range length. The down range length is the projection of half the coherence length (product of 1/bandwidth and speed of light) onto the ground, and the cross range length is the slant range times the angular width of the patch. The latter can be approximated for near broadside patches and large array antennas by the inverse of the product of the Doppler velocity resolution (0.5λ/coherent processing interval) divided by the derivative of v with respect to u as can be obtained from the aforementioned angle-Doppler formula reproduced below:

$$v_m = v_0(u_m \cos\theta_c + (1-u_m^2)^{0.5} \sin\theta_c)$$

Next, Angle-Doppler Keystoning is applied. In concert with transforming into the Doppler frequency domain, resample the array to virtual element locations so as to obtain a distinct interelement spacing $d_m$ for each Doppler frequency bin, $v_m$. The interelement spacing is chosen in accordance with $$u_m d_m = u_{ref} d$$

where $u_{ref}$ denotes the sine angle at which a "vertical" constant sine-angle ridge will appear in angle-Doppler space. A sine-angle beam shift $u_s$ is required to avoid $u_m=0$. Thus, $$(u_m + u_s)d_m = u_{ref} d$$

First, consider a positive shift and thus positive $u_{ref}$ as well. The ratio $$\frac{d_m}{d} = \frac{u_{ref}}{(u_m + u_s)}$$

should exceed zero but not exceed unity to ensure that for an interpolating PRI the interpolation for all $u_m$ is within extent of the data (accurate interpolation to points external to the data is difficult to achieve). Thus $$0 < \frac{u_{ref}}{(u_m + u_s)} \leq 1$$

Consider a shift that is half way between $u_{ref}$ and 1 (edge of real space):

$$u_s = \frac{1 + u_{ref}}{2}$$

Figure 3:
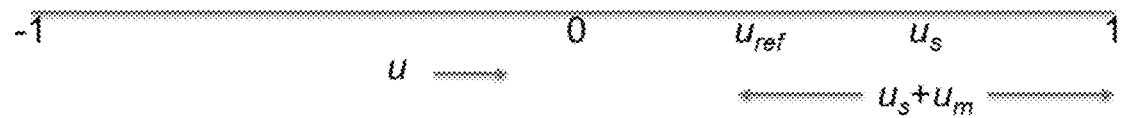
FIG. 3 is a schematic showing Sine-Angle Space Coordinates Showing "Right Shift"

Then $u_m + u_s$ lies between $u_{ref}$ and 1 as illustrated in FIG. 3. Thus the limits on $u_m$ are $$-\frac{1 - u_{ref}}{2} < u_m < \frac{1 - u_{ref}}{2}$$

or $$-u_0 < u_m < u_0$$

where $$u_0 = \frac{1 - u_{ref}}{2}$$

Thus $u_0$ is the maximum off-broadside sine-angle extent of a significant beam.

For example, let $v_0$=50 mps, T=0.2 ms, M=1000 pulses in the dwell, and N=24 half wave spaced channels. Also, let $f_0$=1500 MHz ($\lambda_0/2$=0.1 m). Choose $u_s$=0.75 and $u_{ref}$=0.5. Then, $u_0$=0.25 corresponding to about 0.5/(2/N)=6 standard beamwidths within +/−$u_0$. It follows that $d_m$ is bounded by 0.5d and d. This is a reasonable spread of channel spacings with which to interpolate.

The interpolated points are approximately centered within the physical aperture for each $d_m$ by computing an offset, Δ, that centers the array between Δ and (N−1)$d_m$/d+Δ. Thus, $$\Delta = (N-1) - \left((N-1)\frac{d_m}{d} + \Delta\right)$$

$$\Delta = .5(N-1)\left(1 - \frac{d_m}{d}\right)$$

For STAP processing following ADK, note that the spatial steering vector is Doppler dependent. The clutter ridge of (1) can be inverted (perhaps by creating a suitable table) to yield sine-angle as a function of Doppler velocity, that is, u(v). Let $u_t$ denote the target sine-angle and $v_m$ the target Doppler velocity. After ADK resampling, the channel n phase of the target is given by $$\psi = \frac{2\pi}{\lambda}(u_t + u_s)nd_m$$

$$\psi = \frac{2\pi}{\lambda}(u_t + u_s)n\frac{u_{ref}d}{u(v_m) + u_s}$$

It follows that the target of Doppler velocity $v_m$ will appear at $$u_t' = \frac{u_t + u_s}{u(v_m) + u_s}u_{ref}$$

and the competing clutter is at $u_{ref}$.

Note, the Doppler velocity of a broadside, stationary target may not be zero if there is crab because the clutter ridge component of the total target motion must be considered. Assume that the data is motion compensated by having shifted the clutter ridge in Doppler velocity so that the Doppler velocity of a stationary, broadside target is zero.

Figure 4:
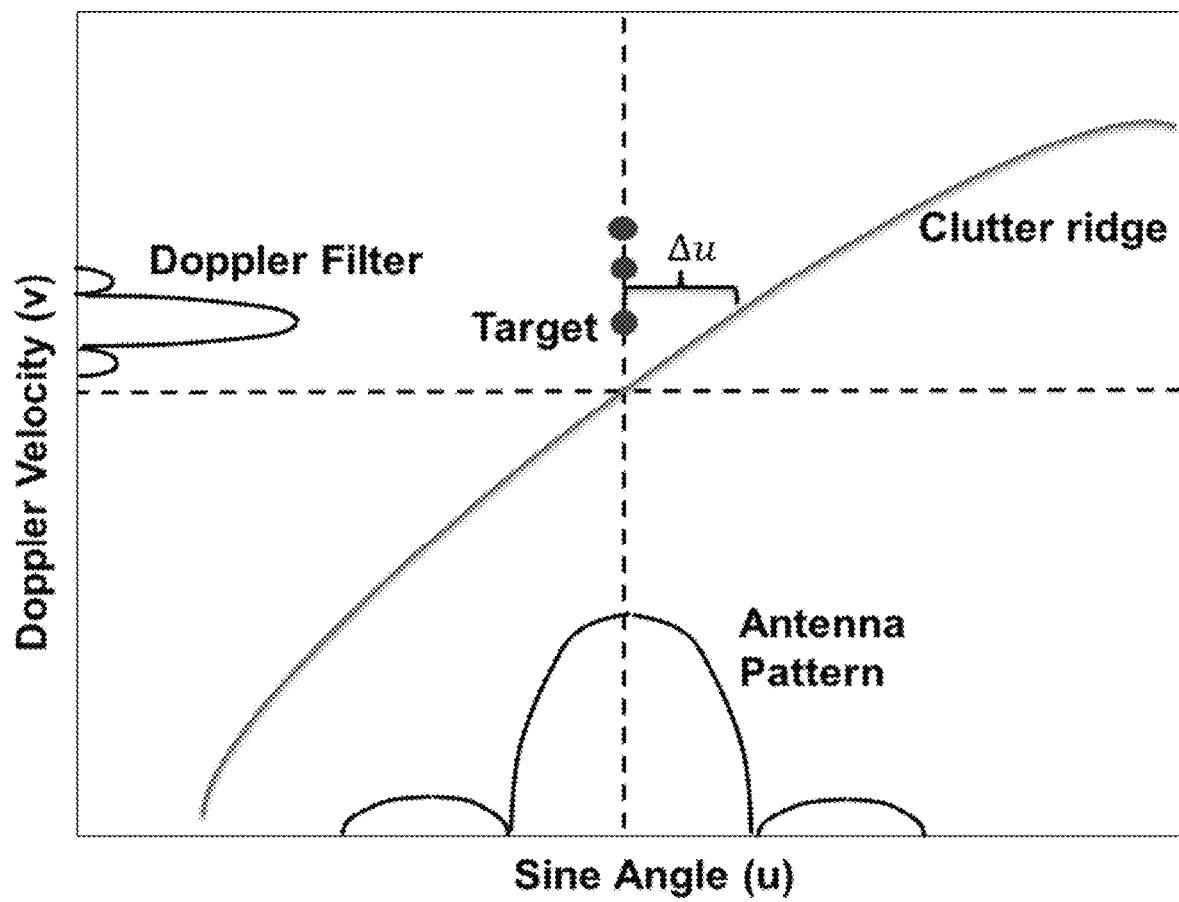
FIG. 4 is a schematic showing Airborne Radar with "Crab" Angle-Doppler Diagram.
Figure 5:
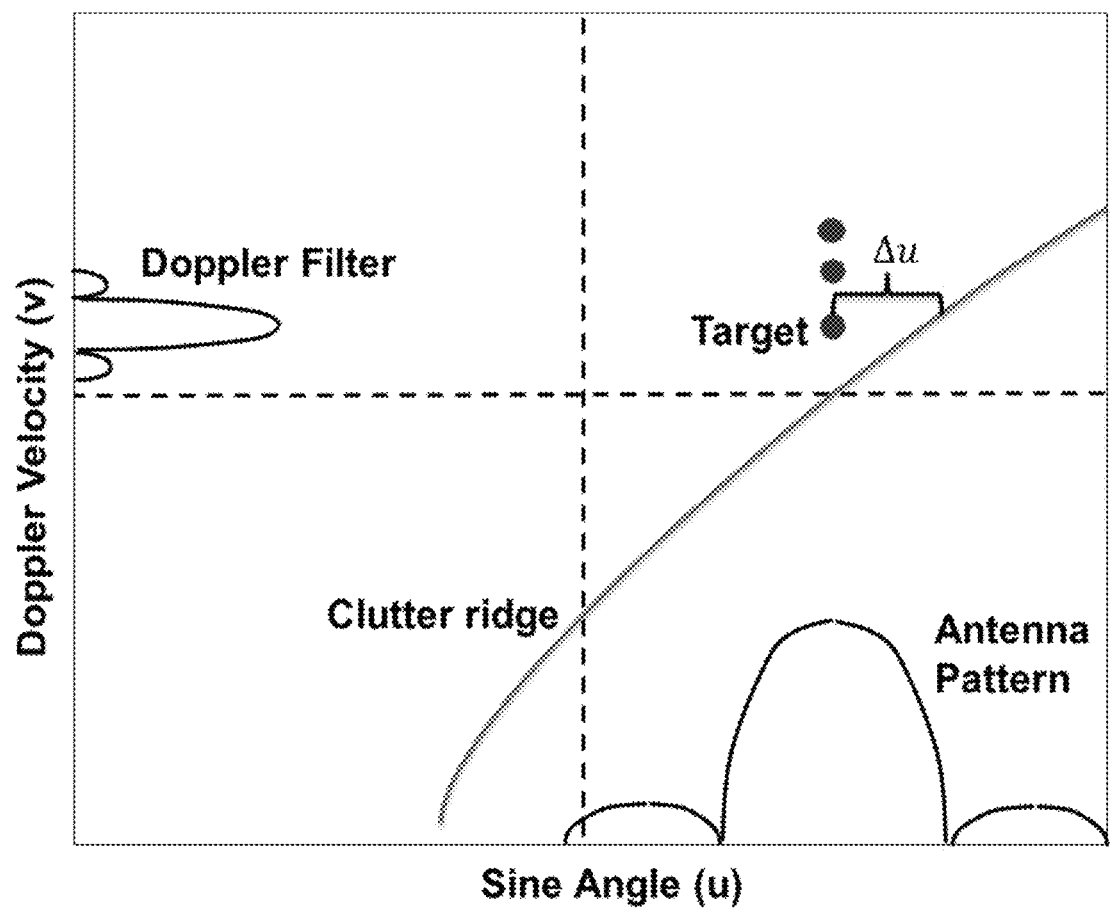
FIG. 5 is a schematic showing Shifted Ridge.
Figure 6:
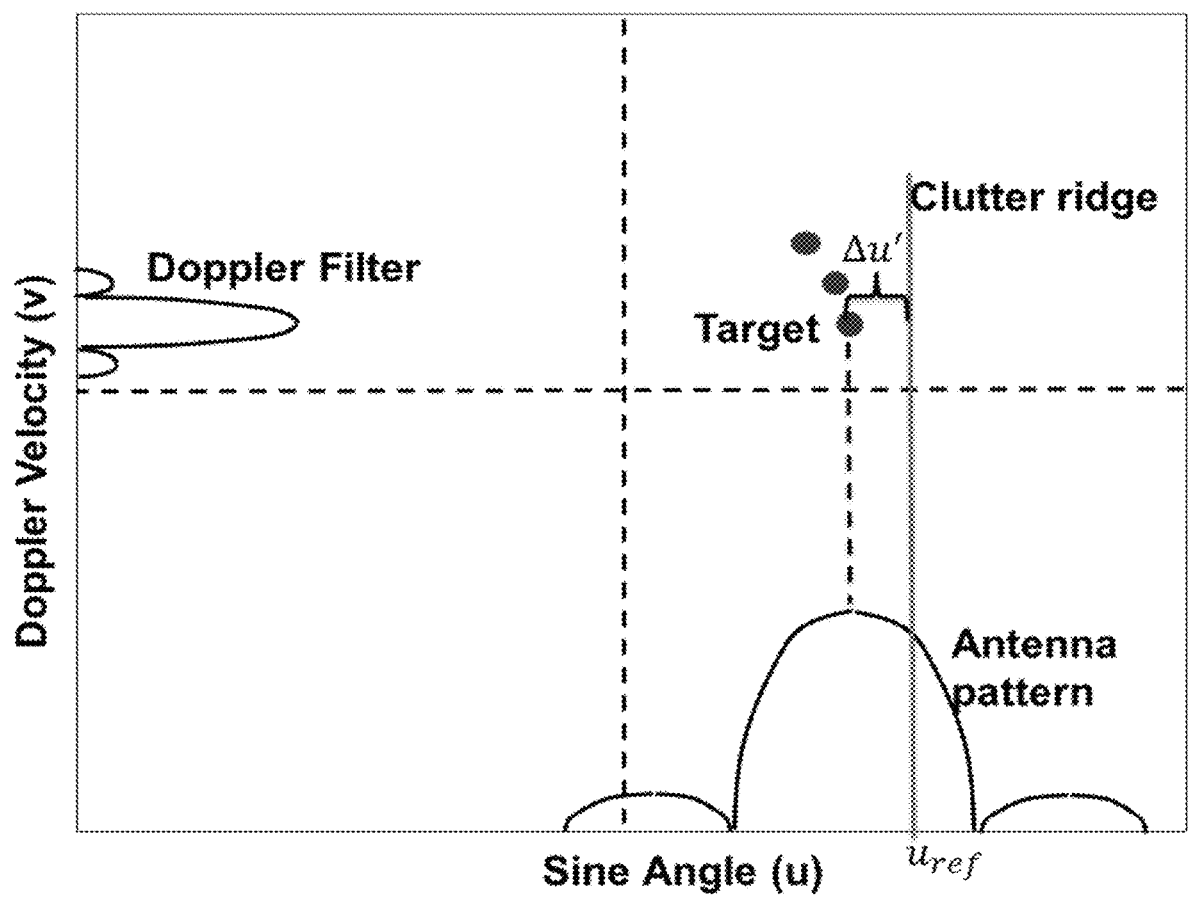
FIG. 6 is a schematic showing Post ADK.

For conventional STAP (prior to ADK), the competing clutter is separated from the clutter ridge along the constant Doppler line by $$\Delta u = u_t - u(v_m)$$

as illustrated in FIG. 4 for a broadside target ($u_t$=0) where $\Delta u = -u(v_m)$. The shifted ridge is illustrated in FIG. 5. Following ADK, then, the separation of a broadside target from the ridge is illustrated in FIG. 6 and given by $$\Delta u' = u_t' - u_{ref}$$

$$\Delta u' = \frac{\Delta u}{u(v_m) + u_s}u_{ref}$$

Finally, the $n^{th}$ element of the appropriate spatial steering vector is given by $$s(n) = e^{j\frac{2\pi}{\lambda}u_t'nd}$$

Figure 7:
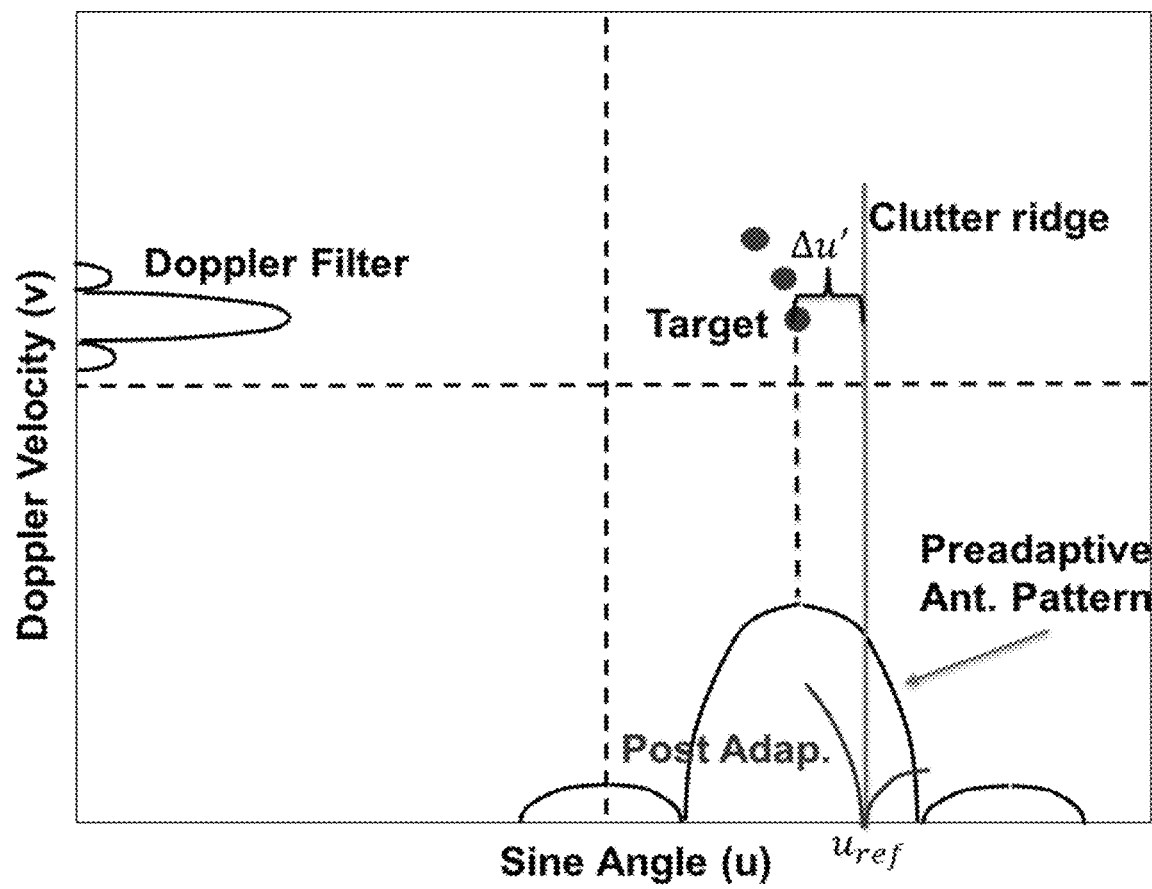
FIG. 7 is a schematic showing Post ADK, Post Adaptive.

FIG. 7 is suggestive of the post adaptive clutter nulling expected with STAP, in particular Factored STAP wherein only spatial DOFs are employed within a Doppler bin and the STAP is repeated for all Doppler bins of interest. If multiple temporal DOFs are employed as well as spatial DOFs, such as with 2-Bin STAP, the suggestive null likely would be coincident with a portion of the clutter ridge.

The clutter ridge shift in angle can be positive or negative about broadside. Apparently, a positive shift is best for detecting a relatively large range of negative Doppler velocity targets. This observation is thought to be due to the close proximity of the shifted ridge to the edge of visible space, i.e., the foldover edge. The angle domain interpolation for Doppler bins beyond foldover, those exhibiting ambiguous angles, do not properly align the ridge. Thus the window of allowable target Doppler velocities is more restricted for positive such velocities than for negative ones. The larger the positive Doppler velocity the closer to the edge. The opposite is true for a negative angle shift of the ridge: the window then favors positive Doppler velocity targets. The appropriate shifts may be opposite if different reference directions of positive Doppler velocity and of positive angle are applied, but the point is that the detection processing may need to be carried out twice to achieve the widest coverage of target velocities. In any case, this concern may not be an issue if only slow movers are of interest.

For a negative ridge shift, the constraints on interpolated spacing ($d_m/d$) leads to $$\frac{d_m}{d} = \frac{u_{ref}}{(u_m + u_s)}$$

$$0 < \frac{u_{ref}}{u_m + u_s} \leq 1$$

where now the reference sine-angle (that is, the sine-angle of the vertical ridge following ADK) and the sine-angle shift are negative; i.e., $$u_{ref} = -|u_{ref}|$$

$$u_s = -|u_s|$$

Choose a shift that is half way between $u_{ref}$ and $-1$ (edge of real space):

$$u_s = \frac{-1 + u_{ref}}{2}$$

$$u_s = -\frac{1 + |u_{ref}|}{2}$$

Figure 8:
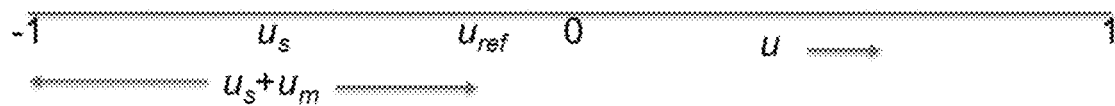
FIG. 8 is a schematic showing Sine-Angle Space Coordinates Showing "Left Shift"

Then $u_m + u_s$ lies between $-1$ and $u_{ref}$ as illustrated in FIG. 8. Thus the limits on $u_m$ are $$-\frac{1 + u_{ref}}{2} < u_m < \frac{1 + u_{ref}}{2}$$

or $$-u_0 < u_m < u_0$$

where $$u_0 = \frac{1 + u_{ref}}{2}$$

is the maximum off-broadside sine angle extent of a significant beam.

Figure 9:
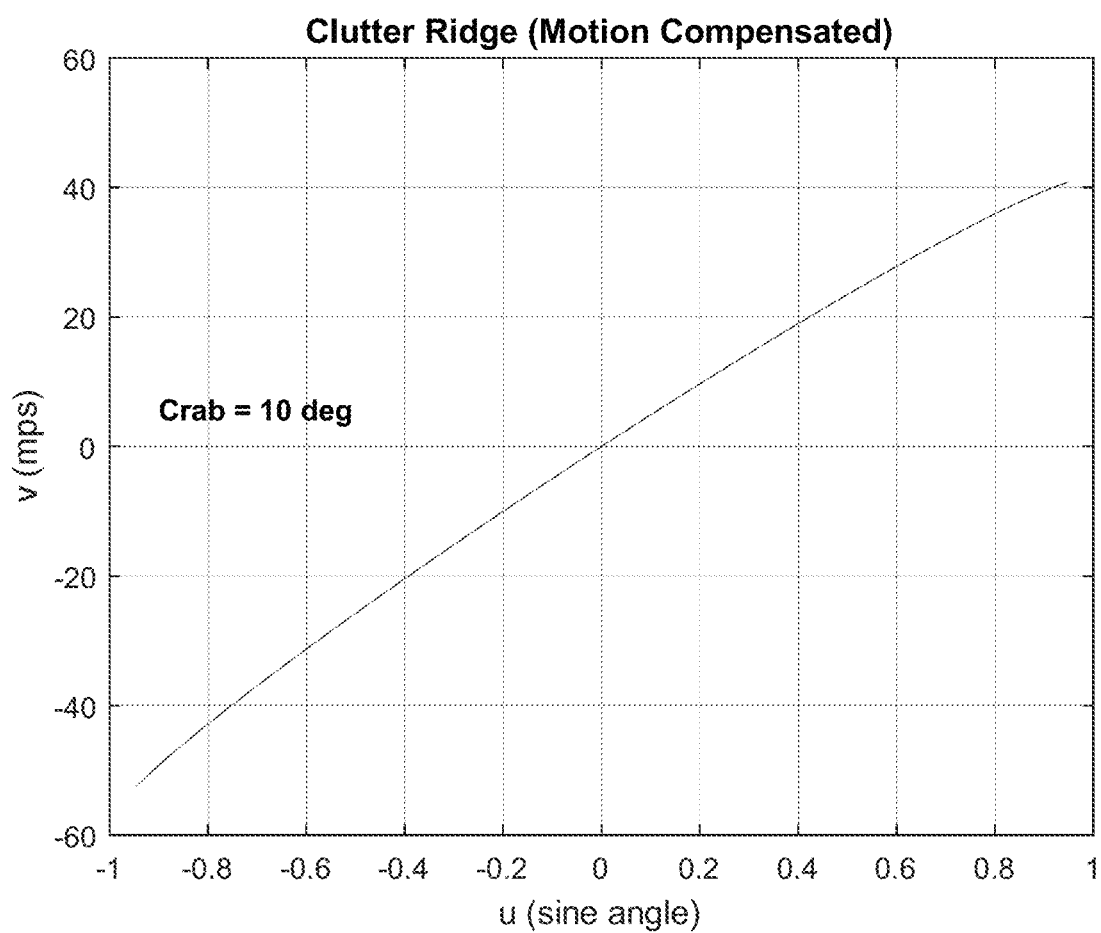
FIG. 9 is a schematic showing Clutter Ridge (Motion Compensated)

To demonstrate performance of the present invention, consider a simulation of scenario and processing parameters as follows:
Broadside beam
50 mps platform
5 kHz PRF
5000 pulses in CPI
24 element array (half wavelength spaced)
1500 MHz frequency In this approach, interelement (channel) spacing is interpolated for each Doppler cell. FIG. 9 shows an ideal crabbed ridge. The data was motion compensated to zero Doppler velocity in the broadside beam direction. FIG. 10 shows the simulated ridge corresponding to 10 degrees crab. Initially the CNR was set to about 40 dB. FIG. 11 shows the ridge following a suitable shift. The shift was chosen to be toward positive sine-angles; i.e., "shift right." Later the shift will be toward negative sine-angles which as mentioned above is preferred for detecting positive Doppler velocity targets.) Because angle space is limited, ADK is applied primarily to detecting slow movers: here between −12.5 and 12.5 mps. FIG. 12 shows the ratio of interpolating interelement spacing to physical channel spacing vs sine-angle applied in ADK. The shift of the clutter ridge and the limitation in extent of target velocities limited the interelement spacing ratio to between 0.5 and 1. The smaller the absolute value of $u_{ref}$, the smaller the lower bound of the ratio, but the larger the spread of target Doppler velocities that are detectable.

There were about 250 Doppler frequency bins within the +/−12.5 mps spread of Doppler velocities within which ADK was applied. FIG. 13 shows the extents of the interpolated channels for each of the frequency bins. The line beginning at Channel 0 and ending at Channel 24 corresponds to the lowest frequency bin. Here there is no interpolation. That beginning near Channel 6 and ending near Channel 17 corresponds to the highest frequency bin. Here there is considerable interpolation and appreciable shortening of the aperture.

FIGS. 14 thru 19 show the interpolation accuracy in amplitude and phase for the lowest, middle, and highest Doppler velocities. FIG. 20 shows the result of applying ADK according to the present invention. Note the nice vertical ridge in spite of crab obtained by including the crabbed ridge equation in the ADK. FIG. 21 shows a constant Doppler amplitude cut (Doppler velocity=0 mps). FIG. 22 shows the broadside target apparent sine-angle as a function of target Doppler velocity (for post ADK processing of a broadside target, the proper spatial steering vector is Doppler velocity dependent). FIG. 23 shows the separation of target from clutter ridge for pre- and post-ADK. The separation distance between target and ridge is taken to be along a constant Doppler line. Post ADK targets appear closer to the ridge than corresponding pre-ADK targets. However, the pre-ADK ridge is sloped whereas the post ADK ridge is vertical. Thus the actual distances of the pre-ADK targets are closer to the ridge than reported in the figure.

FIGS. 24 and 25 show the single-range-cell training signal-to-interference-plus-noise (SINR) and SINR Loss, respectively, for 2-Bin STAP, which is two Doppler bins and all channels as degrees of freedom (DOFs). The high SINR Loss for the largest positive Doppler velocities is likely a consequence of the limitations imposed on positive target Doppler velocities for a positive ridge shift as discussed above. Otherwise performance appears to be reasonably good. For single-range-cell training, Doppler velocity bins were used for training instead of data from other range cells. The Doppler bins were uniformly weighted thus containing high sidelobes. SINR Loss was computed by using the multiple-range-cell training data estimated covariance matrix as the true matrix. Noise may be correlated in the Doppler DOFs and the associated cancelation of noise then may result in SINR Loss appearing overly optimistic. This issue was avoided by computing SINR Loss with noise-only data and normalizing the clutter-plus-noise SINR Loss with the noise-only SINR Loss. To observe the effect of correlated noise and also performance with quiescent weights, four relevant SINRs were computed: Clutter-Data-Quiescent-Weighted SINR ($SINR_{cq}$), Clutter-Data-Adaptive-Weighted SINR ($SINR_{ca}$), Noise-Data-Quiescent-Weighted SINR ($SINR_{nq}$), and Noise-Data-Adaptive-Weighted SINR ($SINR_{na}$). Then, in dB, SINR Loss was found by subtracting Noise-Data-Adaptive-Weighted SINR from Clutter-Data-Adaptive-Weighted SINR. Thus $$SINR\ Loss = SINR_{ca} - SINR_{na}$$

Also, $$SINR_{cq} = 10\ \log(s^H s)^2 / s^H R_c s)$$

$$SINR_{ca} = 10\ \log(s^H R_c^{-1} s)$$

$$SINR_{nq} = 10\ \log((s^H s)^2 / s^H R_n s)$$

$$SINR_{na} = 10\ \log(s^H R_n^{-1} s)$$

where $R_a$ and $R_n$ denote the clutter-plus-noise and noise-only covariance matrices, respectively, and s denotes the steering vector.

FIGS. 26 and 27 pertain to multiple-range-cell training for the same case. The single-range-cell training curves appear smoother than those of multiple-range-cell training perhaps, in part, because 246 bins were applied in the former and only 198 in the latter. FIG. 28 shows the estimated and "true" matrix eigen spectra. These agree fairly well.

The ~40 dB CNR simulation was rerun with targets imbedded in the data to demonstrate detectability with single-range-cell processing. The target SNRs were ~25 dB (−30 dB per channel per pulse and 15 dB below CNR). The targets were evenly spaced in range five cells apart and in Doppler velocity 0.5 mps apart between 1 and 7 mps. Because the targets were of positive Doppler, the ridge was shifted to the left (negative sine-angle shift) to maximize the available Doppler space. FIG. 29 shows the shifted ridge ($u_s = -0.75$). Note that for negative target velocity (targets now appear at sine-angle u=−0.75) the more negative the target velocity the closer the competing clutter is to the visible space edge or foldover angle. That is why the largest range of negative velocity targets occurs with a positive ridge shift and the largest range of positive velocity targets occurs with a negative shift. FIG. 30 shows the vertical ridge following ADK. FIG. 31 shows the span of interpolating channel spacing ratios and FIG. 32 the span of interpolated points for each Doppler velocity. FIG. 33 shows the apparent target sine-angles following ADK. These correspond to the spatial steering vectors. FIG. 34 shows the adaptive and nonadaptive CFAR responses for range cell 20 which contains the 2.5 mps Doppler velocity target. FIG. 35 shows the single-range-cell detector response using the Adaptive Matched Filter STAP statistic. Excellent detectability is evident. FIG. 36 is a corresponding high contrast plot with threshold set at 9 dB below peak. For comparison, FIG. 37 shows the nonadaptive CFAR detector response. Clearly detection is poor for a reasonable threshold. FIG. 38 is a corresponding high contrast plot with threshold set at 2 dB below peak. Many false alarms are evident.

Next the CNR was increased to 65 dB. FIGS. 39 through 44 pertain to processing the data "shifted right." FIG. 39 shows the preprocessed ridge and FIG. 40 the shifted ridge. FIG. 41 shows the post ADK angle-Doppler response. The ridge is nicely oriented vertically. Again, 2-bin element-space STAP was applied. Note the good performance of multiple-range-cell training of FIG. 42 but the poor performance of single-range-cell training of FIG. 43 (note vertical scale). Again, the multiple range cell training covariance matrix was applied as the "true" matrix in the single-range-cell training SINR Loss. FIG. 44 shows the estimated and "true" matrix eigen spectra. Clearly the spectra differ significantly beginning at about 20 dB below peak as expected. These results suggest that training with a combination of range cells and Doppler cells may prove optimal. In conclusion, it appears that ADK is potentially viable for STAP detection of slow movers in highly nonstationary environments.

ADK offers a means of improving bistatic radar STAP and also monostatic radar STAP of small-to-moderate range-altitude ratios. In these scenarios, the shape of the clutter ridge often varies significantly with range. Range cells of ridge lines that differ substantially from that of the test cell must undergo transformation in order to provide suitable training data. The single-range-cell processing of ADK avoids this issue. Also, even if multiple range cell training is still needed, ADK offers an efficient means of aligning ridges of all training data range cells to a common line, and may be superior to Higher Order Doppler Warping (HODW) in this regard.

ADK also applies to cases where the platform is "crabbing," in which case the velocity vector and antenna array axis are misaligned. Note that DPCA is inaccurate in crabbed situations. Also, with DPCA the PRI (T), platform velocity ($v_0$), and channel spacing (d) are not independent but must be constrained to meet the "DPCA condition" of $d = v_0 T$.

For wideband signals, ADK clutter suppression can be reapplied in each of several subbands. This is important because the clutter ridge generally is dispersive. Unfortunately, the dispersion often results in the measured angle and Doppler (i.e., the measured range rate) of a target varying with frequency. For spectral components at which the separation of target and ridge are reduced, one can expect associated loss in SNR. For slow movers though, the target and ridge may move in concert because the angles and Dopplers differ slightly thus maintaining adequate target-clutter separation and minimal SNR loss. Even with successful clutter suppression, the target will be smeared in angle, Doppler, and range. Coherent integration may be too computationally burdensome for target focusing because of the large numbers of steering vectors that need be tested. Non-coherent integration is far less computationally intensive but incurs an SNR cost.

In summary, ADK collapses the clutter ridge to a constant Doppler line ("horizontal line") even if the ridge is nonlinear as in crabbing or, alternatively, to a constant angle ("vertical line"). The ridge can be determined from navigational data or from fitting the data to a low-order polynomial. The fitting process is data dependent and thus compensates somewhat for errors. For wideband signals, ADK clutter suppression is applied separately to each spectral frequency or subband because the clutter ridge then is dispersive.

As described above, the present invention may be a system, a method, and/or a computer program associated therewith and is described herein with reference to flowcharts and block diagrams of methods and systems. The flowchart and block diagrams illustrate the architecture, functionality, and operation of possible implementations of systems, methods, and computer programs of the present invention. It should be understood that each block of the flowcharts and block diagrams can be implemented by computer readable program instructions in software, firmware, or dedicated analog or digital circuits. These computer readable program instructions may be implemented on the processor of a general purpose computer, a special purpose computer, or other programmable data processing apparatus to produce a machine that implements a part or all of any of the blocks in the flowcharts and block diagrams. Each block in the flowchart or block diagrams may represent a module, segment, or portion of instructions, which comprises one or more executable instructions for implementing the specified logical functions. It should also be noted that each block of the block diagrams and flowchart illustrations, or combinations of blocks in the block diagrams and flowcharts, can be implemented by special purpose hardware-based systems that perform the specified functions or acts or carry out combinations of special purpose hardware and computer instructions.

What is claimed is:

1. An airborne radar system, comprising
an antenna having multiple channels and multiple antenna elements, each channel corresponding to a respective antenna element, for receiving a plurality of radar signals having a pulse repetition interval and containing a clutter signal through each of the multiple channels;
a processor coupled to the antenna that is configured to receive each radar signal in each of the multiple channels, to transform each received radar signal for each pulse repetition interval into the frequency domain, to transform any pulse repetition interval components of each frequency of the clutter signal into a respective Doppler frequency bin, wherein the processor is configured to resample by interpolating between the received plurality of radar signals across the channels to provide a plurality of interpolated signals, the interpolated signals corresponding to virtual element locations, to obtain distinct interelement spacing for each Doppler frequency bin such that the clutter signal in each Doppler frequency bin is transformed, in angle-Doppler space, to constant angle, wherein the processor is further configured to filter the clutter signal transformed to constant angle in each Doppler frequency bin.

2. The airborne radar system of claim 1, wherein the processor is configured to identify the clutter signal using the formula $$c'(p, m, n) = B_p(m, n)\exp\left(j\frac{2\pi f_p}{\lambda_0 f_0}u(v_m)nd\right)$$

where d denotes the channel spacing, $f_p$ denotes a pth spectral frequency, and $f_0$ and $\lambda_0$ correspond to a carrier frequency, and $u(v_m)=u_m$ is the inverse of the formula $$v_m=v_0(u_m \cos\theta_c+(1-u_m^2)^{0.5}\sin\theta_c)$$

where $\theta_c$ denotes a crab angle referenced clockwise with respect to an axis of the antenna.

3. The airborne radar system of claim 1, wherein the distinct interelement spacing is selected according to the formula $$u_m d_m = u_{ref} d$$

where $u_{ref}$ denotes the sine angle at which a vertical constant sine-angle ridge will appear in angle-Doppler space.

4. The airborne radar system of claim 3, wherein the processor is programmed to center the interpolated signals within an aperture of the antenna by computing an offset.

5. The airborne radar system of claim 1, wherein filtering comprises space-time adaptive processing on the interpolated signals.

6. A method of performing airborne radar, comprising the steps of:
providing an antenna having multiple channels and multiple antenna elements, each corresponding to a respective antenna element, for receiving a plurality of radar signals having a pulse repetition interval and a clutter signal through each of the multiple channels;
receiving the plurality of radar signals through each of the multiple channels;
sampling each of the plurality of received radar signals;
transforming each of the received signals for each pulse repetition interval into the frequency domain;
transforming any pulse repetition interval components of each frequency of the clutter signal into a respective Doppler frequency bin; and
resampling by interpolating between the received plurality of radar signals across the channels to provide a plurality of interpolated signals, the interpolated signals corresponding to virtual element locations, to obtain distinct interelement spacing for each Doppler frequency bin, such that the clutter signal in each Doppler frequency bin is transformed, in angle-Doppler space, to constant angle, wherein the processor is further configured to filter the clutter signal transformed to constant angle in each Doppler frequency bin.

7. The method of claim 6, further comprising the step of identifying the clutter signal using the formula $$c'(p, m, n) = B_p(m, n)\exp\left(j\frac{2\pi f_p}{\lambda_0 f_0}u(v_m)nd\right)$$

where d denotes the channel spacing, $f_p$ denotes a pth spectral frequency, and $f_0$ and $\lambda_0$ correspond to a carrier frequency, and $u(v_m)=u_m$ is the inverse of the formula $$v_m=v_0(u_m \cos\theta_c+(1-u_m^2)^{0.5}\sin\theta_c)$$

where $\theta_c$ denotes a crab angle referenced clockwise with respect to an axis of the antenna.

8. The method of claim 6, wherein the distinct interelement spacing is selected according to the formula $$u_m d_m = u_{ref} d$$

where $u_{ref}$ denotes the sine angle at which a vertical constant sine-angle ridge will appear in angle-Doppler space.

9. The method of claim 8, further comprising the step of centering the interpolated signals within an aperture of the antenna by computing an offset.

10. The method of claim 6, wherein filtering comprises the step of performing space-time adaptive processing on the interpolated signals.

* * * * *